United States Patent [19]
Ueno

[11] Patent Number: 6,072,477
[45] Date of Patent: Jun. 6, 2000

[54] EL DISPLAY AND DRIVING CIRCUIT FOR THE SAME

[75] Inventor: Yuji Ueno, Shiga, Japan

[73] Assignee: Matsushita Electric Industrial Co., Ltd., Osaka, Japan

[21] Appl. No.: 08/825,136

[22] Filed: Mar. 27, 1997

[30]   Foreign Application Priority Data

Jul. 10, 1996  [JP]  Japan .................................. 8-180318

[51] Int. Cl.[7] .................................................. G09G 3/30
[52] U.S. Cl. .............................................. 345/211; 345/76
[58] Field of Search ................................ 345/76, 90, 92, 345/96, 79, 209, 50, 77, 212, 60, 63, 65, 70, 102, 210, 211; 315/169.2, 169.3, 224, 226; 368/84, 67, 79; 365/189.01

[56]   References Cited

U.S. PATENT DOCUMENTS

| | | | |
|---|---|---|---|
| 4,208,869 | 6/1980 | Hannaoka ................................. | 368/84 |
| 4,449,075 | 5/1984 | D'Onofrio et al. .................. | 315/169.3 |
| 4,527,096 | 7/1985 | Kindlmann ............................ | 315/169.3 |
| 4,888,523 | 12/1989 | Shoji et al. ........................... | 315/169.3 |
| 5,336,978 | 8/1994 | Alessio . | |
| 5,483,503 | 1/1996 | Kimball ................................... | 345/102 |
| 5,489,910 | 2/1996 | Kuwata et al. .......................... | 345/212 |
| 5,555,204 | 9/1996 | Sndoh et al. ........................ | 365/189.01 |
| 5,677,599 | 10/1997 | Wood .................................... | 315/169.3 |

FOREIGN PATENT DOCUMENTS

| | | |
|---|---|---|
| 0 695 980 A1 | 2/1996 | European Pat. Off. . |
| 2-257591 | 10/1990 | Japan . |
| 2 306 809 | 5/1997 | United Kingdom . |
| 2 306 809 A1 | 5/1997 | United Kingdom . |

*Primary Examiner*—Jeffery Brier
*Attorney, Agent, or Firm*—McDermott, Will & Emery

[57]   ABSTRACT

The present EL display includes a step-up circuit for increasing a voltage of a DC power supply in response to a pulse signal output by an oscillator, a switching circuit connected with the step-up circuit and including first through fourth MOSFETs and an inverter, an EL element connected with an output terminal of the switching circuit, and a voltage detector for outputting a control signal in response to an output signal from the switching circuit for instructing a switching operation of the switching circuit. The step-up circuit includes a series circuit of a coil and a diode serially connected with each other and a step-up transistor connected with a node in the series circuit at its main electrode for receiving the pulse signal at its control electrode.

9 Claims, 18 Drawing Sheets

図7

EL DISPLAY AND DRIVING CIRCUIT FOR THE SAME

BACKGROUND OF THE INVENTION

The present invention relates to a driving circuit for an electro-luminescent (EL) element and an EL display using the driving circuit. More particularly, the invention relates to a display comprising a combination of a step-up coil, etc. and a semiconductor IC device.

Recently, an EL display using an EL element is used as a back light or for displaying characters and the like in a face of a wristwatch and a display panel of portable information equipment.

Such a conventional EL display will now be described with reference to the accompanying drawings.

FIG. 10 is a circuit diagram of the EL display using a conventional driving circuit for an EL element. In FIG. 10, a reference numeral 51 denotes an EL element used for light emission of a display panel, a reference numeral 52 denotes a DC power supply, a reference numeral 53 denotes a coil for generating a voltage to be applied to the EL element 51 by increasing a voltage of the DC power supply, and a reference numeral 54 denotes a diode for preventing a voltage in the reverse direction from being applied to the coil 53. In an area 100 integrated on a semiconductor substrate, a reference numeral 55 denotes a step-up transistor of an N-channel MOS transistor grounded at its source electrode, a reference numeral 56 denotes an oscillator, which is connected with the gate electrode of the step-up transistor 55 at its output terminal, for determining a switching frequency of the step-up transistor 55, a reference numeral 57 denotes a frequency divider for determining a frequency of an AC signal generated by inverting the polarity of the voltage applied to the EL element 51, and a reference numeral 60 denotes a switching circuit for generating the AC signal by inverting the polarity of the voltage applied to the EL element 51.

The switching circuit 60 includes a first N-channel MOS transistor 61 and a second N-channel MOS transistor 62, which are connected with the cathode of the diode 54 at their drain electrodes and with a first output terminal X or a second output terminal Y at their source electrodes, serving as a switch for inverting the polarity of the voltage applied to the EL element 51; a third N-channel MOS transistor 63 which is grounded at its source electrode and connected with the source electrode of the first N-channel MOS transistor 61 at its drain electrode and with the gate electrode of the second N-channel MOS transistor 62 at its gate electrode; a fourth N-channel MOS transistor 64 which is grounded at its source electrode and connected with the source electrode of the second N-channel MOS transistor 62 at its drain electrode and with the gate electrode of the first N-channel MOS transistor 61 at its gate electrode; and an inverter 65 for inverting the polarities of a signal applied to the gate electrodes of the first and third N-channel MOS transistors 61 and 63 and a signal applied to the gate electrodes of the second and fourth N-channel MOS transistors 62 and 64 mutually to one another.

In FIG. 10, arrows added to symbols of the N-channel MOS transistors 61, etc. correspond to their source electrodes, which is applicable to other drawings described hereinafter.

Now, the operation of the EL display having the aforementioned configuration will be described. As is shown in FIG. 10, the frequency of a gate voltage V56 applied to the gate electrode of the step-up transistor 55 is determined by the oscillator 56, and the variation of the gate voltage V56 with time is shown in FIG. 11. In FIG. 11, T indicates a cycle of the gate voltage V56, and V65 indicates an output voltage of the inverter 65 determined on the basis of the oscillating frequency of the oscillator 56 and the dividing ratio of the frequency divider 57. In this case, the frequency of the output voltage V65 is approximately 400 Hz. At this point, when the dividing ratio of the frequency divider 57 is set at, for example, 1/16, the cycle of the output voltage V65 is 16 T. In a period while t=0 through 8 T (i.e., a period a in FIG. 11), the output voltage V65 is at a low level, and hence, the second and third N-channel MOS transistors 62 and 63 are in an off-state and the first and fourth N-channel MOS transistors 61 and 64 are in an on-state. In such a case, a voltage at the second output terminal Y connected with the EL element 51 is GND, and a voltage at the first output terminal X is increased up to, for example, approximately 50 through 80 V by the coil 53 and the step-up transistor 55.

V51 in FIG. 11 indicates a voltage applied to the EL element 51 on the basis of the voltage at the second output terminal Y. In a period while t=8 T through 16 T (i.e., a period b in FIG. 11), the output voltage V65 of the invertor 65 is at a high level, and hence, the second and third N-channel MOS transistors 62 and 63 are in an on-state and the first and fourth N-channel MOS transistors 61 and 64 are in an off-state. In this case, the voltage V51 applied to the EL element 51 is discharged through the drain-source conductive path of the third N-channel MOS transistor 63. Therefore, contrary to the period a, the voltage at the first output terminal X connected with the EL element 51 is GND and the voltage at the second output terminal Y is increased.

In this manner, the conventional EL display includes the EL driving circuit for increasing the voltage applied to the EL element and inverting the polarity thereof on the basis of the cycle determined by the oscillator 56 and the frequency divider 57.

In the conventional driving circuit for the EL display, however, the polarity of the voltage applied to the EL element is inverted in a predetermined cycle (that is, 8 T in the aforementioned case). This leads to the following three problems:

First, in the case where a plurality of EL elements are included in the display, voltages applied to the respective EL elements are varied in accordance with fluctuation in the capacitance among the EL elements. This variation in the voltages disadvantageously results in brightness irregularity in the entire display. Such conventional brightness irregularity will be described with reference to FIG. 12, which shows the conventional variation in the voltage applied to the EL element in accordance with the fluctuation in the capacitance of the EL element. In FIG. 12, a solid line indicates a voltage applied to the EL element when its capacitance is relatively small, and a broken line indicates a voltage applied to the EL element when its capacitance is relatively large. As is shown in FIG. 12, in the conventional driving circuit for the display including plural EL elements, the voltages applied to the respective EL elements are varied in a range of approximately ±20% in accordance with the fluctuation in the capacitance of the EL elements. Accordingly, the brightness of the respective EL elements is not uniform, which causes the brightness irregularity in the entire display.

Second, in the case where the EL element is disconnected for a change or some other reason, a capacitance much larger than the capacitance of the transistor is lost. Since a capacitance is in inverse proportion to a voltage, the loss of the capacitance increases the drain voltage of the transistor to exceed the breakdown voltage of the transistor. This can disadvantageously damage the transistor. Specifically, when the EL element is disconnected for a change or some other reason, merely the capacitances of the drain electrodes of the first through fourth N-channel MOS transistors 61 through 64 of the switching circuit 60 remain as the load for the driving circuit of FIG. 10. These capacitances are several pF through several tens pF, which is far smaller than the capacitance of the EL element 51, i.e., 1000 pF or more. Accordingly, owing to the voltage increased by the coil 53, the drain voltages of the N-channel MOS transistors 61 through 64 are increased to exceed their drain breakdown voltages.

Thirdly, as is shown in FIG. 12, the waveform of the voltage applied to the EL element is steep at the fall from the increased voltage to 0 V in switching the polarity. Accordingly, since the frequency for switching the polarity is approximately 400 Hz, this steep fall in the waveform of the voltage results in applying oscillation to the EL element. This can disadvantageously cause a noise. Particularly in portable communication equipment such as a portable telephone and other electronic equipment in which a noise caused in use leads to nonconformity, the oscillation noise of the EL element is desired to be decreased. Therefore, it is indispensably necessary to improve the waveform of the voltage applied to the EL element.

SUMMARY OF THE INVENTION

The first object of the invention is decreasing brightness irregularity of an EL element, the second object is preventing damage of internal elements such as a transistor which can be caused in disconnecting an EL element, and the third object is decreasing a noise resulting from oscillation of an EL element.

For achieving the first or second object, the EL display of this invention comprises step-up signal generating means for generating a step-up signal by increasing a supply voltage in accordance with a pulse signal; switching means for outputting a first output signal in response to the step-up signal and for outputting a second output signal by inverting a polarity of the step-up signal; an EL element connected with an output of the switching means; and a voltage detector for inverting a polarity of the second output signal of the switching means by receiving the first output signal from the switching means and outputting a control signal to the switching means on the basis of a predetermined voltage of the received first output signal.

In this EL display, the switching means for generating an AC signal for driving the EL element is connected with the voltage detector. The voltage detector controls the switching means in response to the first output signal from the switching means on the basis of the predetermined voltage of the first output signal. Accordingly, the polarity of the second output signal of the switching means is inverted not depending upon a time period but when the first output signal is increased to the predetermined voltage. This can suppress fluctuation in a voltage for driving the EL element. As a result, the brightness irregularity in the entire display can be suppressed. Furthermore, since the voltage to be applied to the EL element is inverted when the first output signal is increased to the predetermined voltage, by setting the predetermined voltage at a value not exceeding the breakdown voltages of transistors included in the switching means, the transistors cannot be damaged even when the EL element is disconnected from the output terminal.

In one aspect of the EL display, the step-up signal generating means preferably includes a series circuit of a coil and a diode serially connected with each other at a node; and a step-up transistor connected with the node in the series circuit at a main electrode thereof for receiving the pulse signal at a control electrode thereof. In this manner, the voltage of a DC power supply can be definitely increased.

In another aspect, the EL display preferably further comprises an oscillator for outputting the pulse signal to the step-up signal generating means, the switching means preferably includes a transistor, the step-up signal generating means preferably includes a series circuit including a diode and a coil, the diode being connected with a main electrode of the transistor of the switching means at a cathode, and one end of the coil being connected with a power supply and the other end of the coil being connected with an anode of the diode through a node; and a step-up transistor connected with the node in the series circuit at a main electrode thereof for receiving the pulse signal at a control electrode thereof, and the control signal output by the voltage detector preferably enters a control electrode of the transistor of the switching means. In this manner, the voltage of the DC power supply can be definitely increased. Moreover, the first output signal output by the switching means enters the input of the voltage detector and the control signal output by the voltage detector enters the control electrode of the transistor of the switching means. Therefore, the voltage detector can definitely detect the voltage of the first output signal and invert the polarity of the second output signal from the switching means.

For achieving the third object, in one aspect of the EL display, the second output signal of the switching means preferably has a blunt waveform. In this manner, in the waveform of the second output signal of the switching means for generating the AC signal for driving the EL element, the conventionally steep fall can be made gentle, so that oscillation of the EL element derived from an AC component of the voltage applied to the EL element can be suppressed. As a result, a noise resulting from the oscillation can be suppressed.

For achieving the third object, the EL display preferably further comprises a resistor serially connected between the switching means and the EL element for delaying discharge time of a charge discharged through the switching means. In this manner, the switching means for generating the AC signal for driving the EL element can discharge a charge in the EL element through the resistor serially connected between the switching means and the EL element. Therefore, the waveform during the discharge is delayed due to a resistance component of the resistor to be made blunt, resulting in making gentle the conventionally steep fall of the voltage to be applied to the EL element. Accordingly, the oscillation of the EL element derived from the AC component of the voltage can be suppressed and a noise resulting from the oscillation can be suppressed.

For achieving the first or second object, the driving circuit for a display of this invention comprises a switching circuit including a first N-channel MOS transistor and a second N-channel MOS transistor connected with each other at drain electrodes thereof; a third N-channel MOS transistor grounded at a source electrode thereof, connected with a source electrode of the first N-channel MOS transistor at a drain electrode thereof and with a gate electrode of the second N-channel MOS transistor at a gate electrode thereof; a fourth N-channel MOS transistor grounded at a source electrode thereof, connected with a source electrode of the second N-channel MOS transistor at a drain electrode thereof and with a gate electrode of the first N-channel MOS transistor at a gate electrode thereof; a first output terminal connected with the drain electrode of the third N-channel MOS transistor; and a second output terminal connected with the drain electrode of the fourth N-channel MOS transistor; and a voltage detector for receiving output signals from the first and second output terminals of the switching circuit, and for outputting control signals in mutually reverse phases to the gate electrode shared by the first and fourth N-channel MOS transistors and the gate electrode shared by the second and third N-channel MOS transistors.

In the driving circuit for a display, the switching circuit for generating an AC signal for driving an EL element is connected with the voltage detector for receiving an output signal of the switching circuit and outputting a control signal to the switching circuit. Therefore, the polarity of the output signal of the switching circuit is inverted depending upon not a time period but the output signal of the switching circuit. This can suppress fluctuation in the AC voltage for driving the EL element. As a result, the brightness irregularity of the display can be suppressed.

In one aspect of the driving circuit for a display, a voltage polarity of the control signal is preferably inverted in the voltage detector when an output signal of the switching circuit exceeds a predetermined voltage. In this manner, the switching circuit can definitely output the AC signal at the predetermined voltage to the EL element. Furthermore, the polarity is inverted when the voltage to be applied to the EL element exceeds the predetermined voltage. Therefore, by setting the predetermined voltage at a value not exceeding the breakdown voltages of the transistors included in the switching means, the transistors cannot be damaged even when the EL element is disconnected from the output terminal.

For achieving the third object, in another aspect of the driving circuit for a display, an output signal of the switching circuit preferably has a blunt waveform. In this manner, in the waveform of the output signal of the switching circuit, the conventionally steep fall of the voltage to be applied to the EL element can be made gentle. As a result, the oscillation of the EL element derived from the AC component of the voltage can be suppressed, so as to suppress a noise resulting from the oscillation.

For achieving the third object, the driving circuit for a display preferably further comprises a resistor serially connected between the switching circuit and at least one of the first and second output terminals for delaying discharge time of a charge discharged through the switching circuit. In this manner, the switching circuit for generating the AC signal for driving the EL element can discharge a charge in the EL element through the resistor serially connected between the switching circuit and the EL element. Therefore, the waveform during the discharge can be delayed owing to the resistance component of the resistor to be made blunt, resulting in making gentle the conventionally steep fall of the voltage to be applied to the EL element. Accordingly, the oscillation of the EL element derived from the AC component of the voltage can be suppressed and a noise resulting from the oscillation can be suppressed.

BRIEF DESCRIPTION OF THE DRAWINGS

FIGS. 5(a) through 5(d) show signal waveforms of output signals in the EL driving circuit of the second embodiment, wherein FIG. 5(a) is a graph of a voltage waveform between a switching circuit and a resistor, FIG. 5(b) is a graph of a voltage waveform at a first output terminal connected with the resistor, FIG. 5(c) is a graph of a voltage waveform at a second output terminal not connected with the resistor, and FIG. 5(d) is a graph of a signal waveform resulting from a potential difference between the first output terminal and the second output terminal;

FIGS. 7(a) through 7(d) show signal waveforms of output signals in the EL driving circuit of the first modification of the second embodiment, wherein FIG. 7(a) is a graph of a voltage waveform between a switching circuit and a resistor, FIG. 7(b) is a graph of a voltage waveform at a second output signal connected with the resistor, FIG. 7(c) is a graph of a voltage waveform at a first output terminal not connected with the resistor, and FIG. 7(d) is a graph of a signal waveform resulting from a potential difference between the first and second output terminals;

FIGS. 9(a) through 9(e) show signal waveforms of output signals in the EL driving circuit of the second modification of the second embodiment, wherein FIG. 9(a) is a graph of a voltage waveform between a switching circuit and a first resistor, FIG. 9(b) is a graph of a voltage waveform at a first output terminal connected with the first resistor, FIG. 9(c) is a graph of a voltage waveform at a second output terminal connected with a second resistor, FIG. 9(d) is a graph of a voltage waveform between the switching circuit and the second resistor, and FIG. 9(e) is a graph of a signal waveform resulting from a potential difference between the first and second output terminals;

FIGS. 14(a) through 14(d) show signal waveforms of output signals in the conventional EL driving circuit provided with the resistor, wherein FIG. 14(a) is a graph of a voltage waveform between a switching circuit and the resistor, FIG. 14(b) is a graph of a voltage waveform at a first output terminal connected with the resistor, FIG. 14(c) is a graph of a voltage waveform at a second output terminal not connected with the resistor, and FIG. 14(d) is a graph of a signal waveform resulting from a potential difference between the first output terminal and the second output terminal;

FIGS. 16(a) through 16(d) show signal waveforms of output signals in the conventional EL driving circuit provided with the resistor, wherein FIG. 16(a) is a graph of a voltage waveform between a switching circuit and the resistor, FIG. 16(b) is a graph of a voltage waveform at a second output terminal connected with the resistor, FIG. 16(c) is a graph of a voltage waveform at a first output terminal not connected with the resistor, and FIG. 16(d) is a graph of a signal waveform resulting from a potential difference between the first and second output terminals;

FIGS. 18(a) through 18(e) show signal waveforms of output signals in the conventional EL driving circuit provided with the first and second resistors, wherein FIG. 18(a) is a graph of a voltage waveform between a switching circuit and the first resistor, FIG. 18(b) is a graph of a voltage waveform at a first output terminal connected with the first resistor, FIG. 18(c) is a graph of a voltage waveform at a second output terminal connected with the second resistor, FIG. 18(d) is a graph of a voltage waveform between the switching circuit and the second resistor, and FIG. 18(e) is a graph of a signal waveform resulting from a potential difference between the first and second output terminals.

DETAILED DESCRIPTION OF THE INVENTION

A first embodiment of the invention will now be described with reference to the accompanying drawings.

Figure 1:
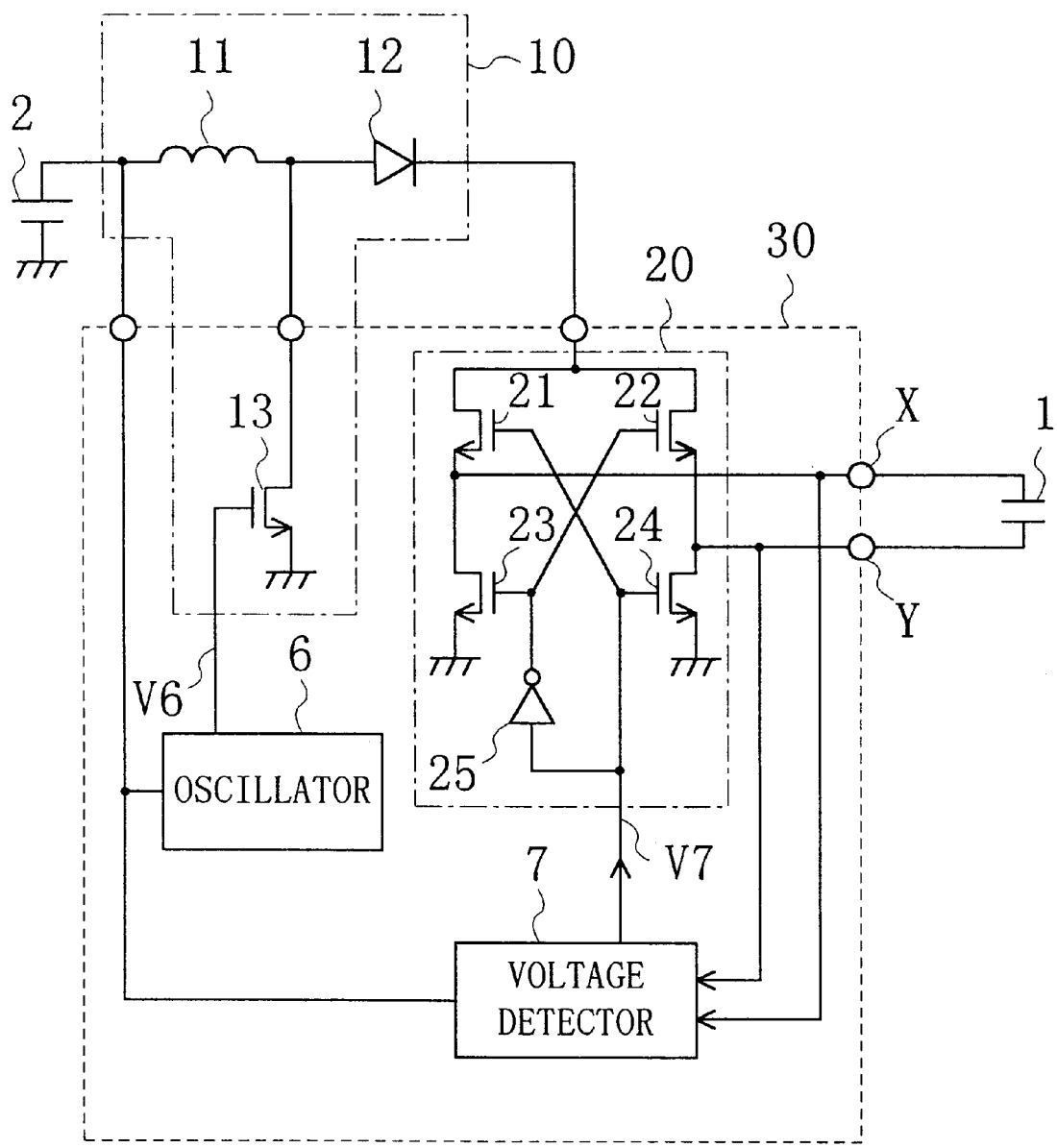
FIG. 1 is a circuit diagram of an EL display using an EL driving circuit according to a first embodiment of the invention.

FIG. 1 is a circuit diagram of an EL display using an EL driving circuit of the first embodiment of the invention. In FIG. 1, a reference numeral 1 denotes an EL element used for light emission of a display panel, a reference numeral 2 denotes a DC power supply, a reference numeral 10 denotes a step-up circuit working as step-up signal generating means for generating a voltage to be applied to the EL element 1 by increasing a voltage of the DC power supply 2, a reference numeral 20 denotes a switching circuit working as switching means for generating an AC signal by inverting the polarity of the voltage to be applied to the EL element 1, and a reference numeral 30 denotes an area for integration on a semiconductor substrate.

The step-up circuit 10 includes a coil 11 connected with the DC power supply 2 at its one end, a diode 12, connected with the other end of the coil 11 at its anode and with the switching circuit 20 at its cathode, for preventing a voltage in the reverse direction from being applied to the coil 11, and a step-up transistor 13 of an N-channel MOS transistor grounded at its source electrode and connected with a node between the coil 11 and the diode 12 at its drain electrode serving as a main electrode.

Also in FIG. 1, a reference numeral 6 denotes an oscillator, which is connected with the gate electrode, serving as a control electrode, of the step-up transistor 13 at its output port and with the DC power supply 2 at its input port, for determining a switching frequency of the step-up transistor 13. A reference numeral 7 denotes a voltage detector for detecting a predetermined voltage as a first output signal for inverting the polarity of the voltage to be applied to the EL element 1, and the voltage detector 7 is connected with the DC power supply 2 at one of the input terminals, with a first output terminal X and a second output terminal Y for connection with the EL element 1 at its other input terminal, and with the switching circuit 20 at its output terminal.

The switching circuit 20 includes a first N-channel MOS transistor 21 and a second N-channel MOS transistor 22, which are connected with the cathode of the diode 12 of the step-up circuit 10 at their drain electrodes, with the first output terminal X or the second output terminal Y at their source electrodes, for working as a switch for inverting the polarity of the voltage to be applied to the EL element 1; a third N-channel MOS transistor 23 grounded at its source electrode, connected with the source electrode of the first N-channel MOS transistor 21 at its drain electrode and with the gate electrode of the second N-channel MOS transistor 22 at its gate electrode; a fourth N-channel MOS transistor 24 grounded at its source electrode, connected with the source electrode of the second N-channel MOS transistor 22 at its drain electrode and with the gate electrode of the first N-channel MOS transistor 21 at its gate electrode; and an invertor 25 for receiving a control signal output by the voltage detector 7 and for inverting the polarities of the control signal to be applied to the gate electrode shared by the first and third N-channel MOS transistors 21 and 23 and the control signal to be applied to the gate electrode shared by the second and fourth N-channel MOS transistors 22 and 24 mutually to each other. A potential difference between the first output terminal X and the second output terminal Y corresponds to a second output signal.

It is noted that the driving circuit for the EL display of this embodiment includes at least the switching circuit 20 and the voltage detector 7.

Now, the operation of the EL display including the driving circuit with the aforementioned configuration will be described.

Figure 2:
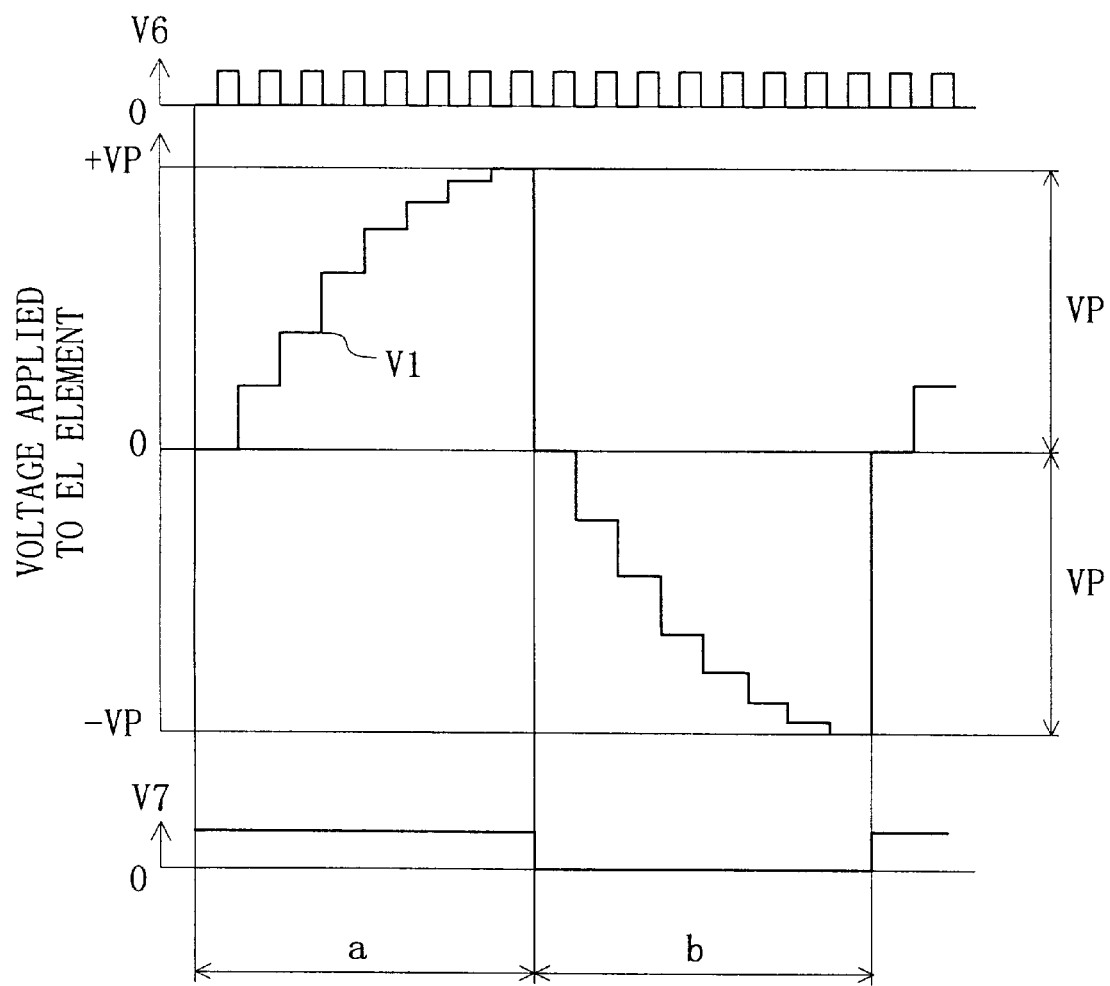
FIG. 2 is a timing chart of output signals of an oscillator, an output terminal and a voltage detector in the EL display of the first embodiment.

FIG. 2 is a timing chart of the driving circuit of this embodiment, wherein V6 indicates an output signal of the oscillator 6, V7 indicates an output signal of the voltage detector 7, and V1 indicates a voltage to be applied to the EL element 1 on the basis of a voltage at the second output terminal Y connected with the EL element 1. As is shown in FIG. 2, while the output signal V7 of the voltage detector 7 is at a high level (corresponding to a period a in FIG. 2), the first and fourth N-channel MOS transistors 21 and 24 are in an on-state and the second and third N-channel MOS transistors 22 and 23 are in an off-state. In this case, the voltage at the second output terminal Y among the two output terminals connected with the EL element 1 of FIG. 1 is GND, and the voltage at the first output terminal X is increased by the coil 11 and the step-up transistor 13 up to a voltage of, for example, 50 through 80 V to be applied to the EL element 1. When the voltage V1 to be applied to the EL element 1 is increased to a predetermined voltage (+VP), the voltage detector 7 detects this voltage, and outputs the signal V7 at a low level until a predetermined voltage (−VP) is detected (corresponding to a period b in FIG. 2). In this case, contrary to the period a, the first and fourth N-channel MOS transistors 21 and 24 are in an off-state, and a charge stored in the EL element 1 is discharged through the third N-channel MOS transistor 23. As a result, the voltage at the first output terminal X connected with the EL element 1 is GND, and the voltage at the second output terminal Y is increased by the coil 11 and the step-up transistor 13.

The predetermined voltage VP is set at a value exceeding neither the drain breakdown voltages of the N-channel MOS transistors 21 through 24 nor the breakdown voltage of the EL element 1.

The voltage detector can be a circuit using a Zener diode, a circuit using a resistive divider, a comparator or the like, and is preferably a circuit using a Zener diode which is highly accurate and inexpensive. When the circuit using a Zener diode is used as the voltage detector, fluctuation in the voltage V1 to be applied to the EL element 1 can be suppressed to fluctuation in the characteristic of the Zener diode itself.

Figure 3:
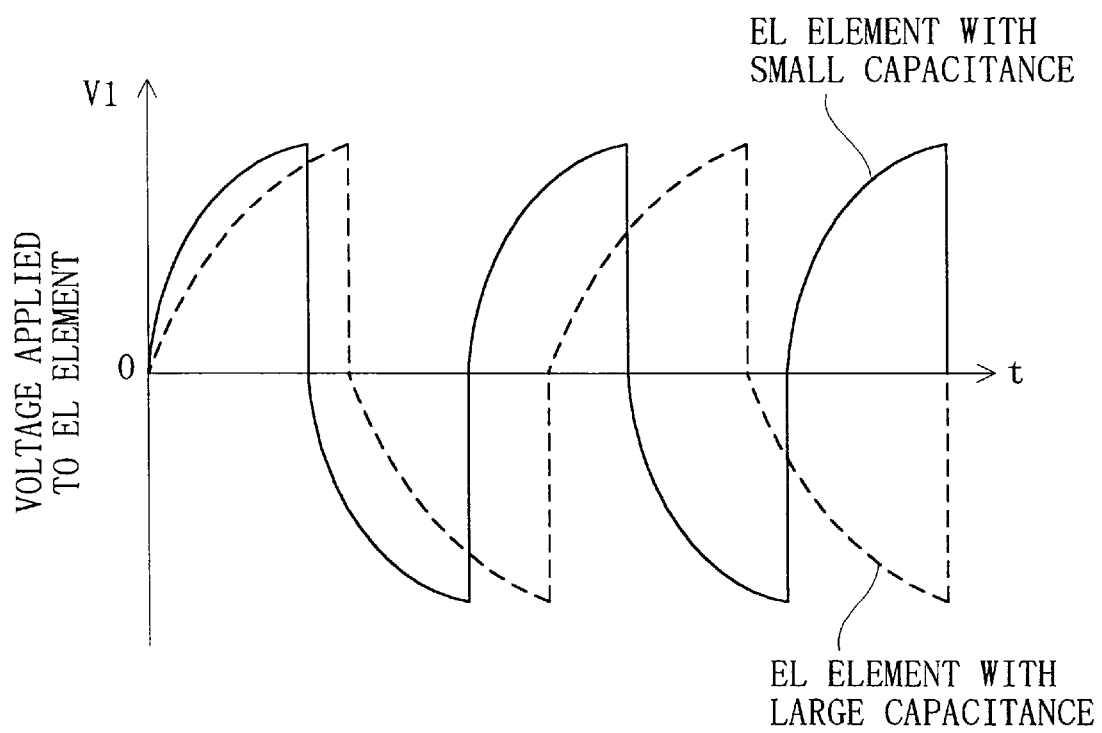
FIG. 3 is a graph of an output signal applied to an EL element in the driving circuit of the first embodiment.

In this manner in this embodiment, the voltage detector 7 monitors the voltage to be applied to the EL element 1 being increased up to the predetermined voltage VP without depending upon a time period, and the polarity of the voltage V1 to be applied to the EL element 1 is inverted on detecting the predetermined voltage VP. Accordingly, even when the EL display includes both an EL element having a relatively large capacitance, shown with a solid line in FIG. 3, and an EL element having a relatively small capacitance, shown with a broken line in FIG. 3, the maximum absolute values of the voltages V1 to be applied to the respective EL elements are substantially the same. As a result, the display including a plurality of EL elements can be free from brightness irregularity. In this case, the fluctuation in the capacitance in the respective EL elements appears in the time-axis direction. However, it appears as a DC of approximately 400 Hz, and hence does not affect a displayed image.

Furthermore, since the predetermined voltage VP detected by the voltage detector 7 is set at a value exceeding neither the drain breakdown voltages of the N-channel MOS transistors 21 through 24 nor the breakdown voltage of the EL element 1, even when the EL element 1 is disconnected for a change or some other reason, each transistor included in the driving circuit is prevented from being supplied with a voltage exceeding the predetermined voltage VP. As a result, the transistors cannot be damaged.

The step-up transistor 13 of the MOS transistor is used in this embodiment, which does not limit the invention, and the MOS transistor can be replaced with a bipolar transistor.

A second embodiment of the invention will now be described with reference to the accompanying drawings.

Figure 4:
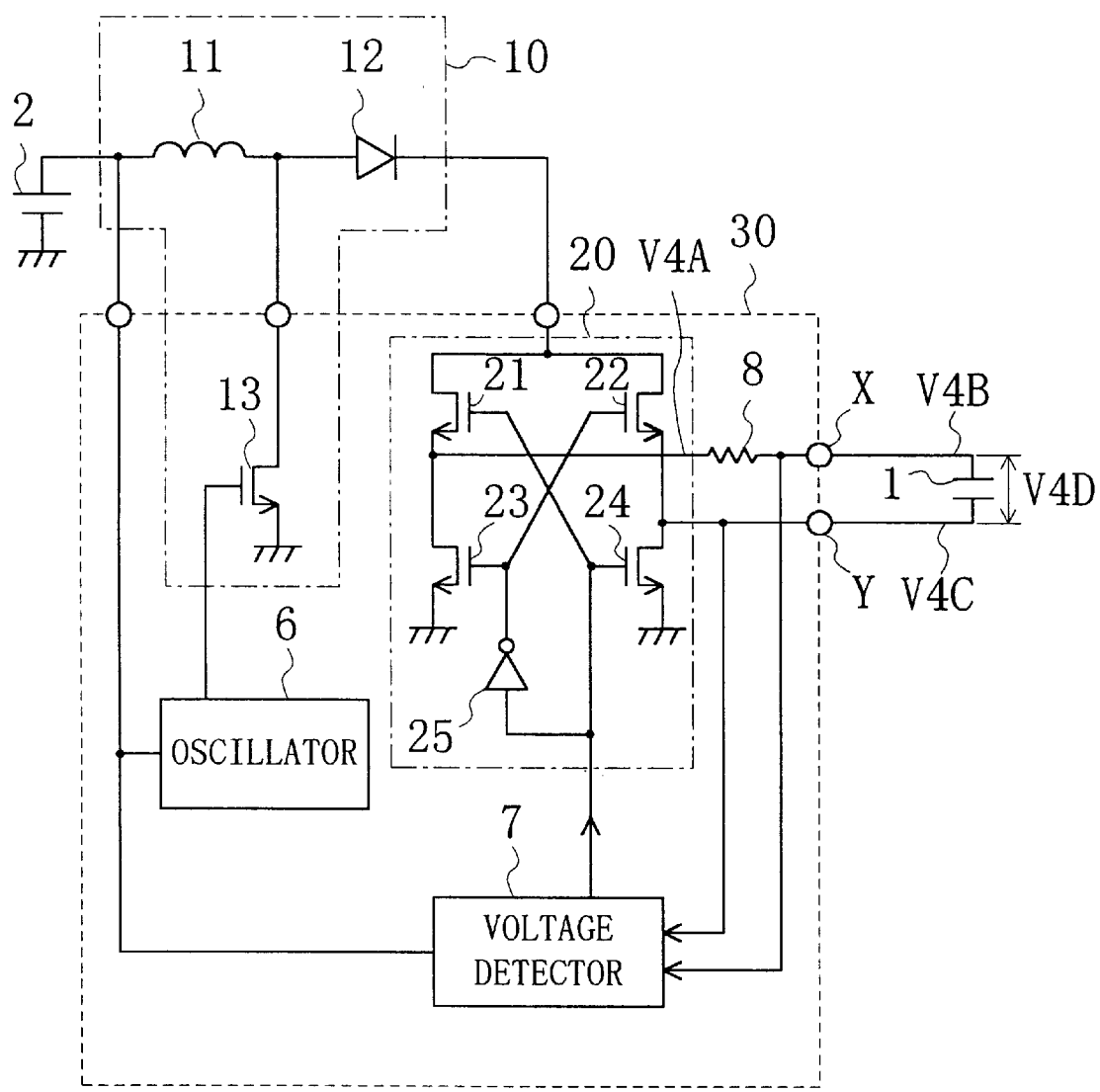
FIG. 4 is a circuit diagram of an EL display using an EL driving circuit according to a second embodiment of the invention.

FIG. 4 is a circuit diagram of an EL display using an EL driving circuit of the second embodiment. In FIG. 4, like reference numerals are used to refer to like elements used in the EL display of FIG. 1, and the description is omitted. As an additional composing element, as is shown in FIG. 4, a resistor 8 is serially connected between the first output terminal X and a node between the source electrode of the first N-channel MOS transistor 21 and the drain electrode of the third N-channel MOS transistor 23 of the switching circuit 20. In FIG. 4, V4A indicates a voltage at the node between the source electrode of the first N-channel MOS transistor 21 and the drain electrode of the third N-channel MOS transistor 23, V4B indicates a voltage at the first output terminal X, V4C indicates a voltage at a node between the source electrode of the second N-channel MOS transistor 22 and the drain electrode of the fourth N-channel MOS transistor 24, namely, a voltage at the second output terminal Y, and V4D indicates a potential difference between the first output terminal X and the second output terminal Y corresponding to the voltage to be applied to the EL element 1, namely, a difference between the voltages V4B and V4C.

Now, the operation of the EL display having the aforementioned configuration will be described. As is described in the first embodiment, the frequency of the gate voltage of the step-up transistor 13 in the step-up circuit 10 depends upon the output signal of the oscillator 6. Accordingly, when the first and fourth N-channel MOS transistors 21 and 24 are in an on-state and the second and third N-channel MOS transistors 22 and 23 are in an off-state, the voltage V4A of the source electrode of the first N-channel MOS transistor 21 is increased by the coil 11 and the step-up transistor 13 of the step-up circuit 10, and the voltage V4C at the second output terminal Y is 0 V.

Figure 5A:
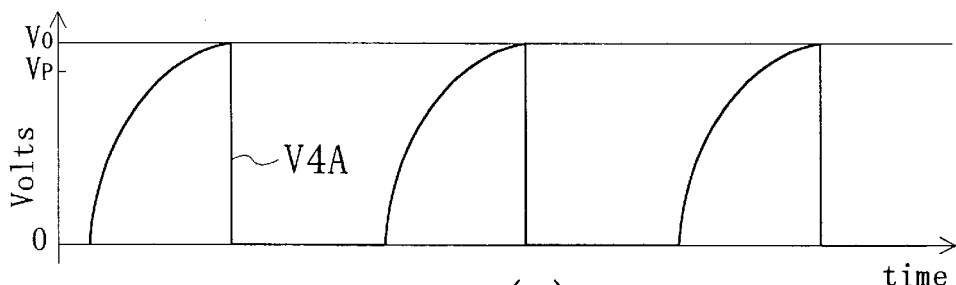
Figure 5B:
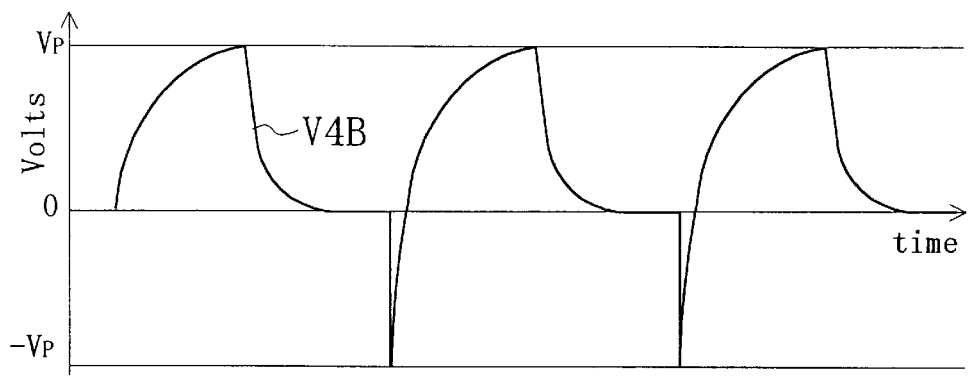
Figure 5C:
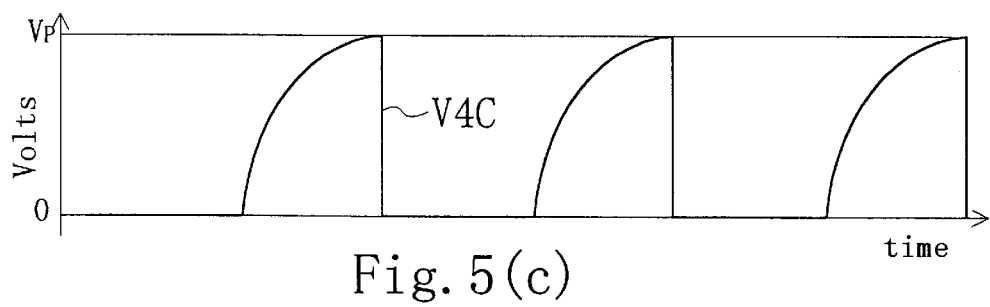

This voltage variation will be specifically described with reference to FIGS. 5(a) through 5(d). While the voltage V4A shown in FIG. 5(a) is being increased, the voltage V4C shown in FIG. 5(c) remains to be 0 V. Also, as is shown in FIG. 5(b), the voltage V4B having passed through the resistor 8 is decreased by the resistor 8. When the voltage V4B is increased to the predetermined voltage VP, the voltage detector 7 of FIG. 3 detects the predetermined voltage VP and inverts the control signal. In response to the control signal, the first and fourth N-channel MOS transistors 21 and 24 are turned off and the second and third N-channel MOS transistors 22 and 23 are turned on. As a result, the voltage V4C shown in FIG. 5(c) is increased and the voltage V4A shown in FIG. 5(a) is decreased to 0 V. At this point, as is shown in FIG. 5(b), since the voltage V4B is discharged through the resistor 8, it is integrated with respect to the product of a capacitance component of the EL element 1 and a resistance component of the resistor 8. Thus, the waveform at the fall becomes blunt.

Next, when the voltage V4C shown in FIG. 5(c) is increased up to the predetermined voltage VP, the on- and off-states of the respective transistors are inverted again, so that the voltage V4A shown in FIG. 5(a) is increased. At this point, the voltage V4C is decreased to 0 V, and the voltage V4B is instantaneously decreased to a minus potential by the decreased amount of the voltage V4C and then starts to increase.

Figure 5D:
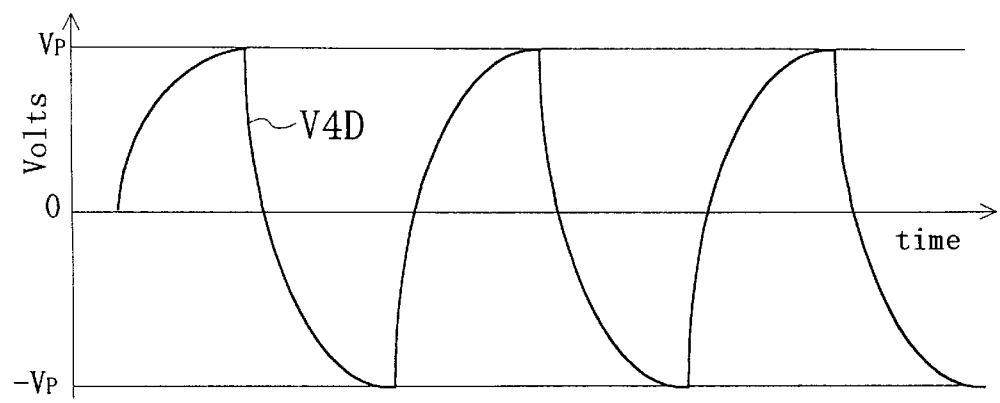

As is shown in FIG. 5(d), the voltage V4D to be applied to the EL element 1 corresponds to a difference between the voltages V4B and V4C, and the voltage waveform of the voltage V4D is made blunt at the fall from the increased voltage to 0 V. Furthermore, the maximum absolute value VP of the voltage V4D to be applied to the EL element 1 is equal to that obtained without providing the resistor 8. Therefore, the brightness of the EL element 1 cannot be degraded.

In this manner, the display of this embodiment includes the voltage detector 7, which monitors the voltage to be applied to the EL element 1 being increased up to the predetermined voltage VP and inverts the polarity of the voltage V4D to be applied to the EL element 1 when the predetermined voltage VP is detected. Accordingly, even when the display includes both an EL element having a relatively large capacitance and an EL element having a relatively small capacitance, the maximum absolute values of the voltages V4D to be applied to the respective EL elements are substantially the same. As a result, the display including a plurality of EL elements can be free from the brightness irregularity.

Furthermore, the predetermined voltage VP is set at a value exceeding neither the drain breakdown voltages of the N-channel MOS transistors 21 through 24 nor the breakdown voltage of the EL element 1, and the voltage detector 7 monitors the predetermined voltage VP corresponding to the maximum value of the voltage V4D. Accordingly, when the EL element 1 is disconnected for a change or some other reason, each transistor included in the driving circuit is prevented from being supplied with a voltage exceeding the predetermined voltage VP, and hence cannot be damaged.

In addition, since the resistor 8 is serially disposed between the switching circuit 20 and the first output terminal X, the steep fall in the waveform of the voltage V4D resulting from the generation of the AC signal can be delayed so as to make the waveform blunt. As a result, the oscillation of the EL element can be suppressed, so that a noise resulting from the oscillation can be suppressed.

Moreover, since the waveform can be delayed while retaining the predetermined voltage VP, the noise can be suppressed without degrading the brightness of the EL element.

In order to suppress an oscillation noise, i.e., a drive noise, of the EL element, the resistance value of the resistor 8 is set to be several kΩ and fall time in the waveform of the voltage to be applied to the EL element 1 from the increased voltage to 0 V is set to be several tens μ sec.

Figure 6:
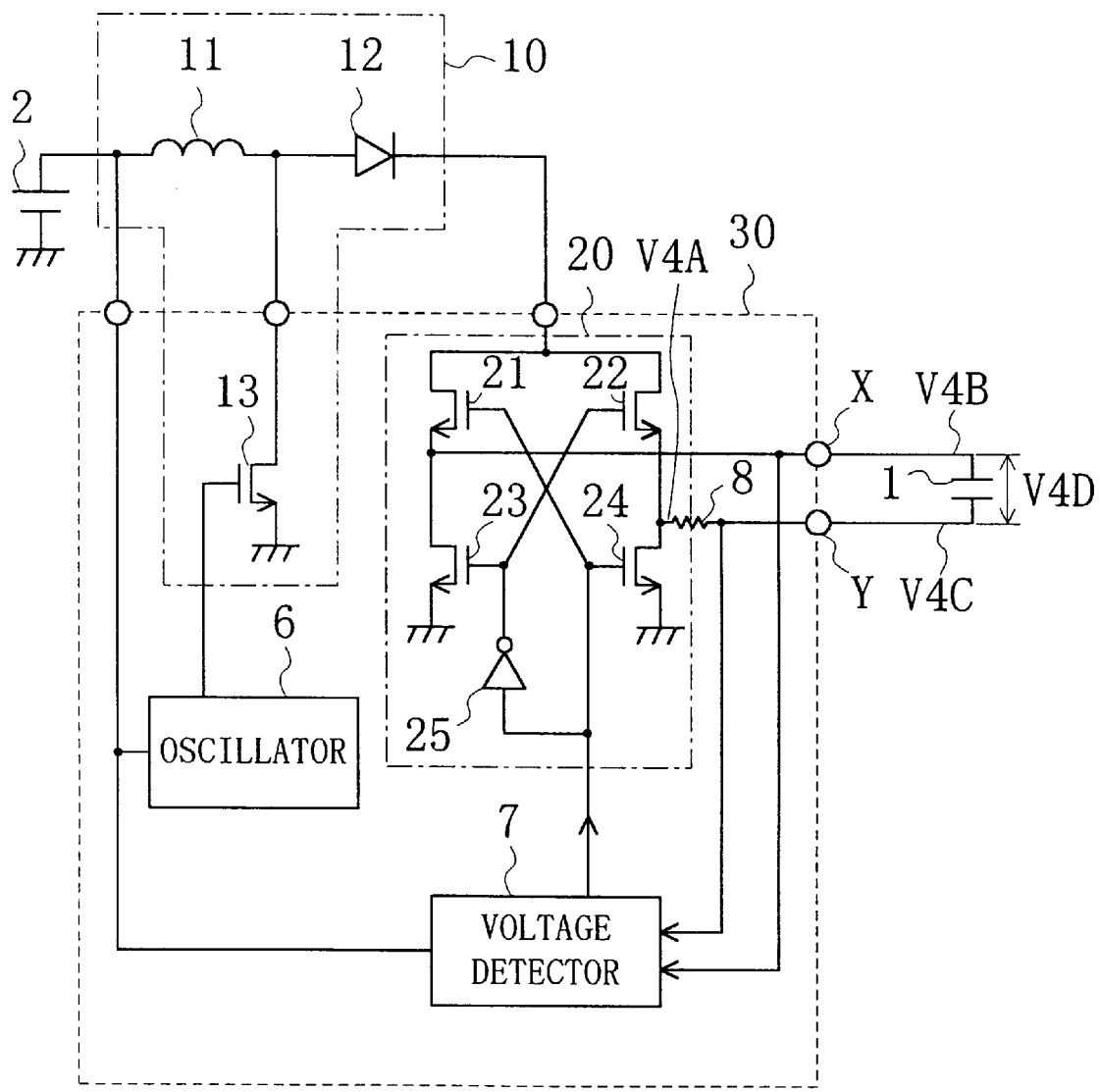
FIG. 6 is a circuit diagram of an EL display using an EL driving circuit according to first modification of the second embodiment.
Figure 7A:
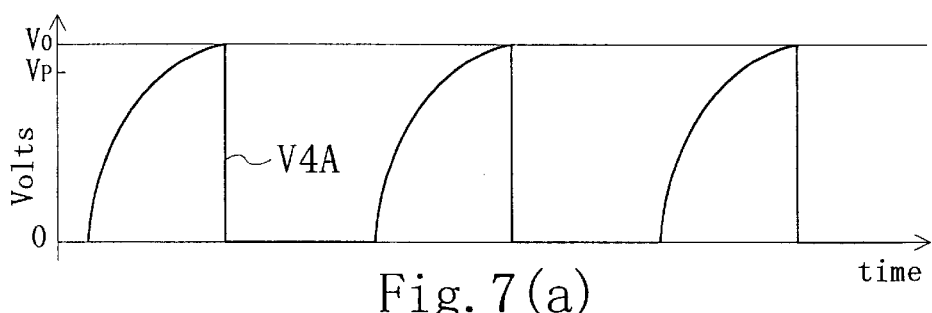
Figure 7B:
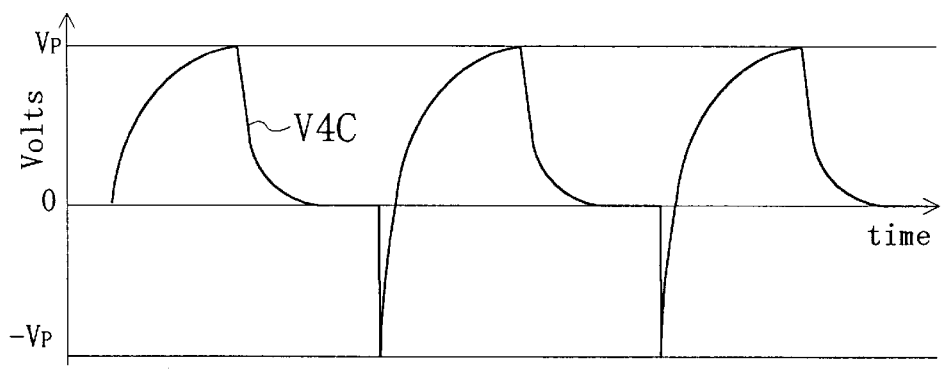
Figure 7C:
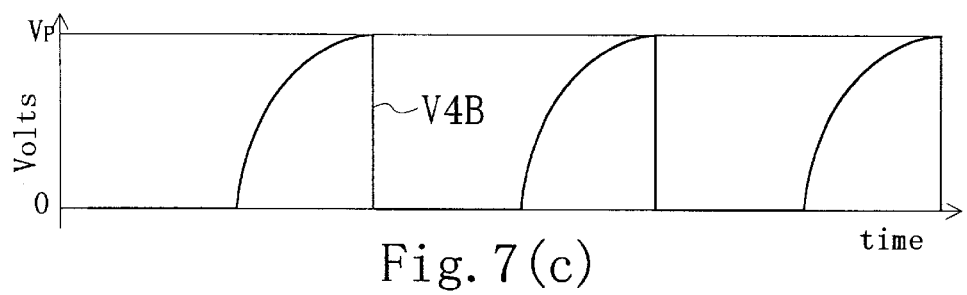
Figure 7D:
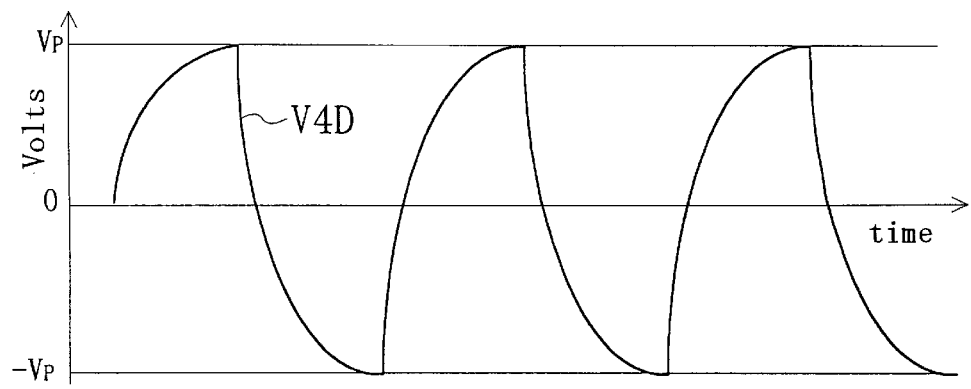

FIG. 6 is a circuit diagram of an EL display according to first modification of the second embodiment, wherein the resistor 8 is serially connected between the switching circuit 20 and the second output terminal Y not between the switching circuit 20 and the first output terminal X. A voltage V4A of FIG. 6 indicates a voltage at the source electrode of the second N-channel MOS transistor 22. In this case, as is shown in an output signal waveform of FIG. 7(b), a voltage V4C having passed through the resistor 8 is decreased by the resistor 8 and discharged through the resistor 8, resulting in making blunt the waveform at the fall. Therefore, as is shown in FIG. 7(d), the voltage waveform of a voltage V4D, corresponding to a potential difference between the voltages V4B and V4C, to be applied to the EL element 1 is made blunt at the fall from the increased voltage VP to 0 V. Thus, the same effect as that of the second embodiment can be attained.

Figure 8:
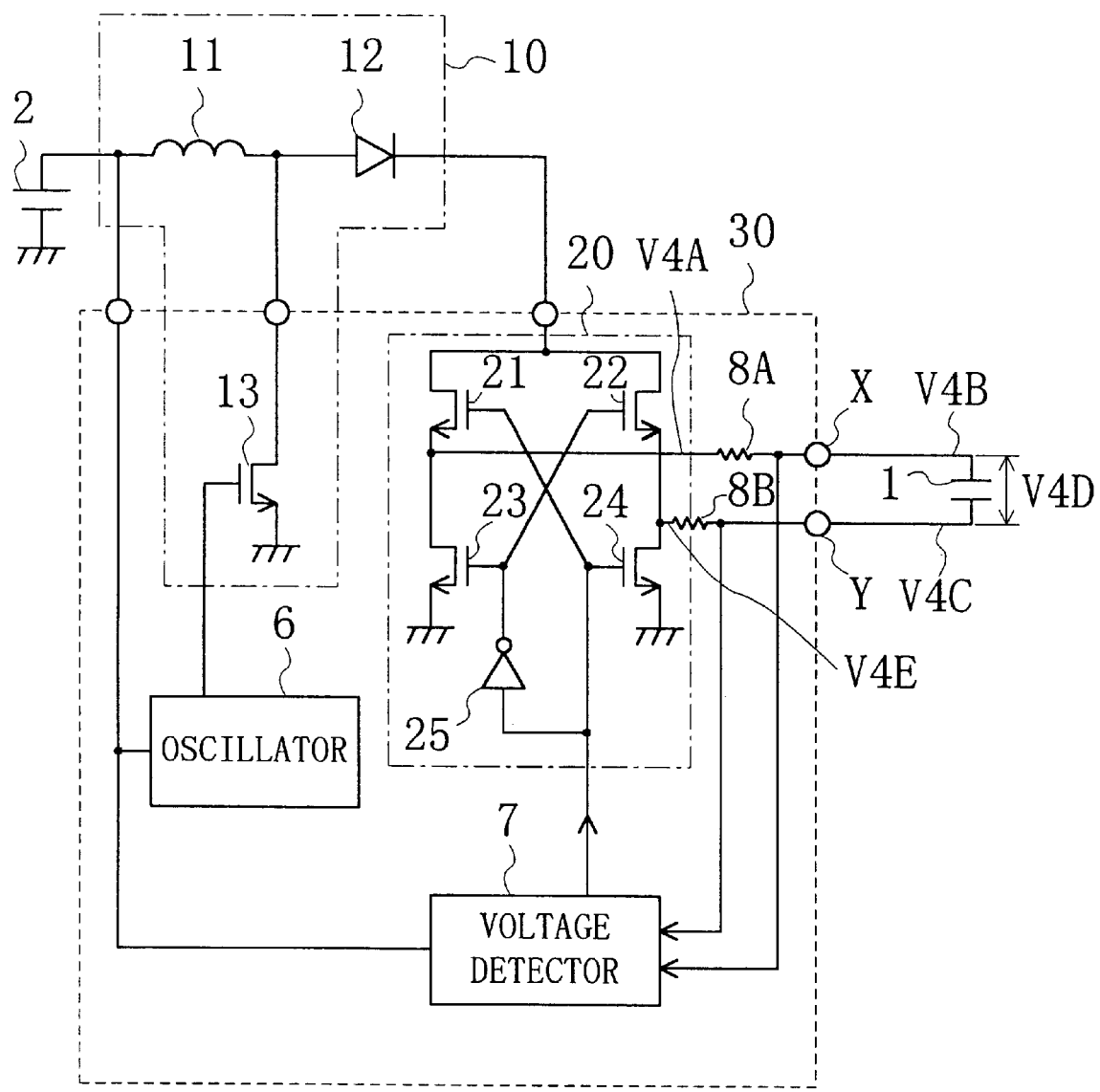
FIG. 8 is a circuit diagram of an EL display using an EL driving circuit according to second modification of the second embodiment.
Figure 9A:
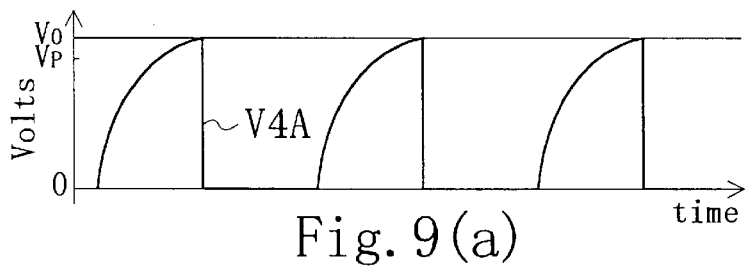
Figure 9B:
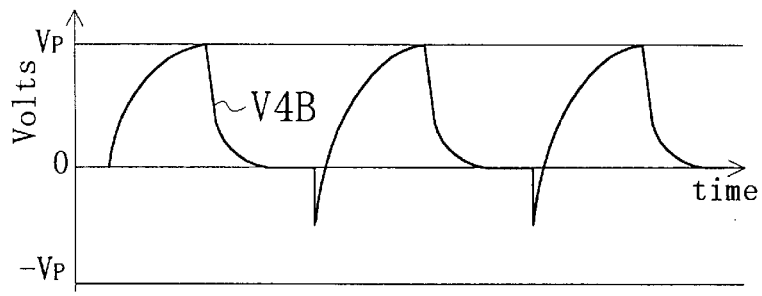
Figure 9C:
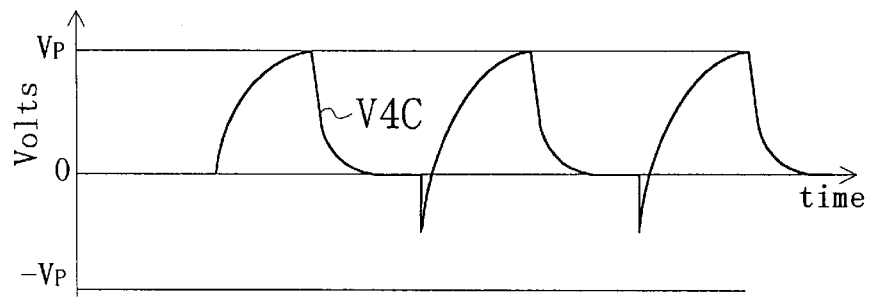
Figure 9D:
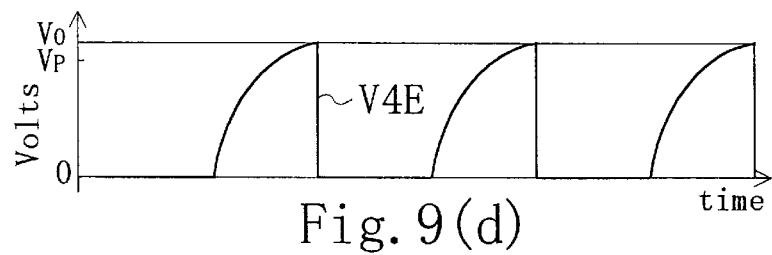
Figure 9E:
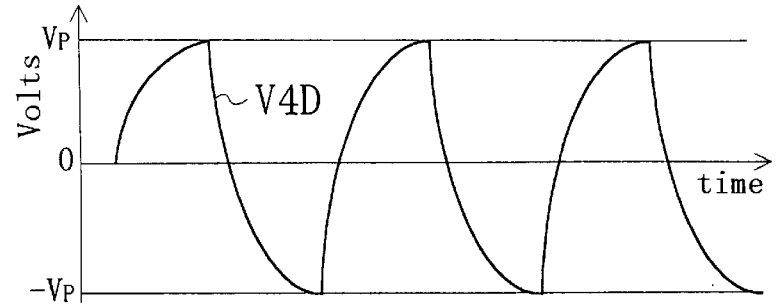

FIG. 8 is a circuit diagram of an EL display according to second modification of the second embodiment, wherein a first resistor 8A is serially connected between the switching circuit 20 and the first output terminal X and a second resistor 8B is serially connected between the switching circuit 20 and the second output terminal Y. A voltage V4A of FIG. 8 indicates a voltage at the source electrode of the first N-channel MOS transistor 21, and a voltage V4E indicates a voltage at the source electrode of the second N-channel MOS transistor 22. In this case, as is shown in an output signal waveform of FIG. 9(b), a voltage V4B having passed through the first resistor 8A is discharged through the first resistor 8A, and as is shown in an output signal waveform of FIG. 9(c), a voltage V4C having passed through the second resistor 8B is discharged through the second resistor 8B. Therefore, the waveforms at the falls are both made blunt. As a result, as is shown in FIG. 9(e), the waveform of a voltage V4D to be applied to the EL element 1 is made blunt at the fall from the increased voltage VP to 0 V. Thus, the same effect as that of the second embodiment can be attained. As is shown in the output signal waveforms of FIGS. 9(b) and 9(c), these voltages are instantaneously decreased and then start to be increased.

Figure 10:
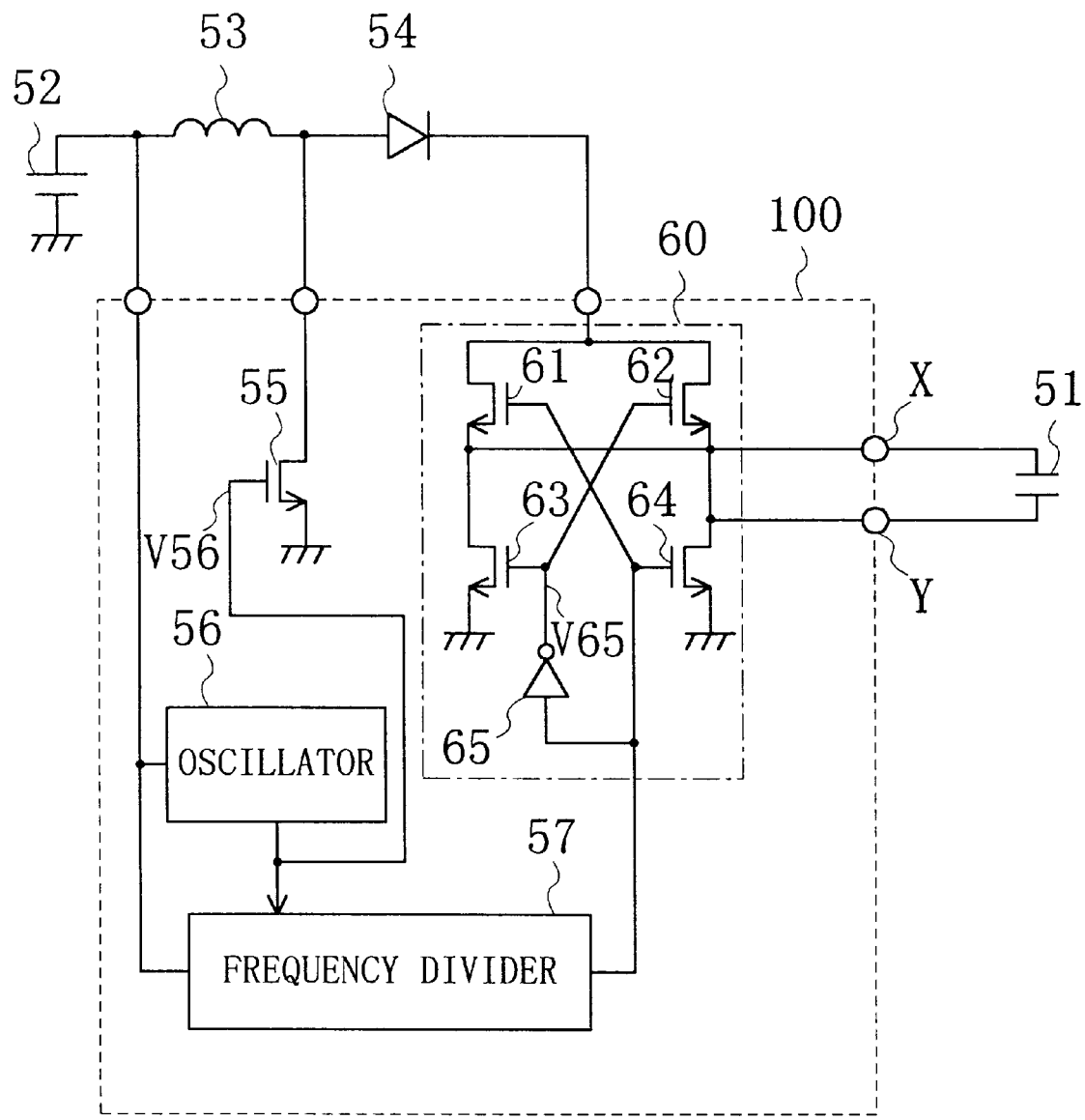
FIG. 10 is a circuit diagram of an EL display using a conventional EL driving circuit.
Figure 11:
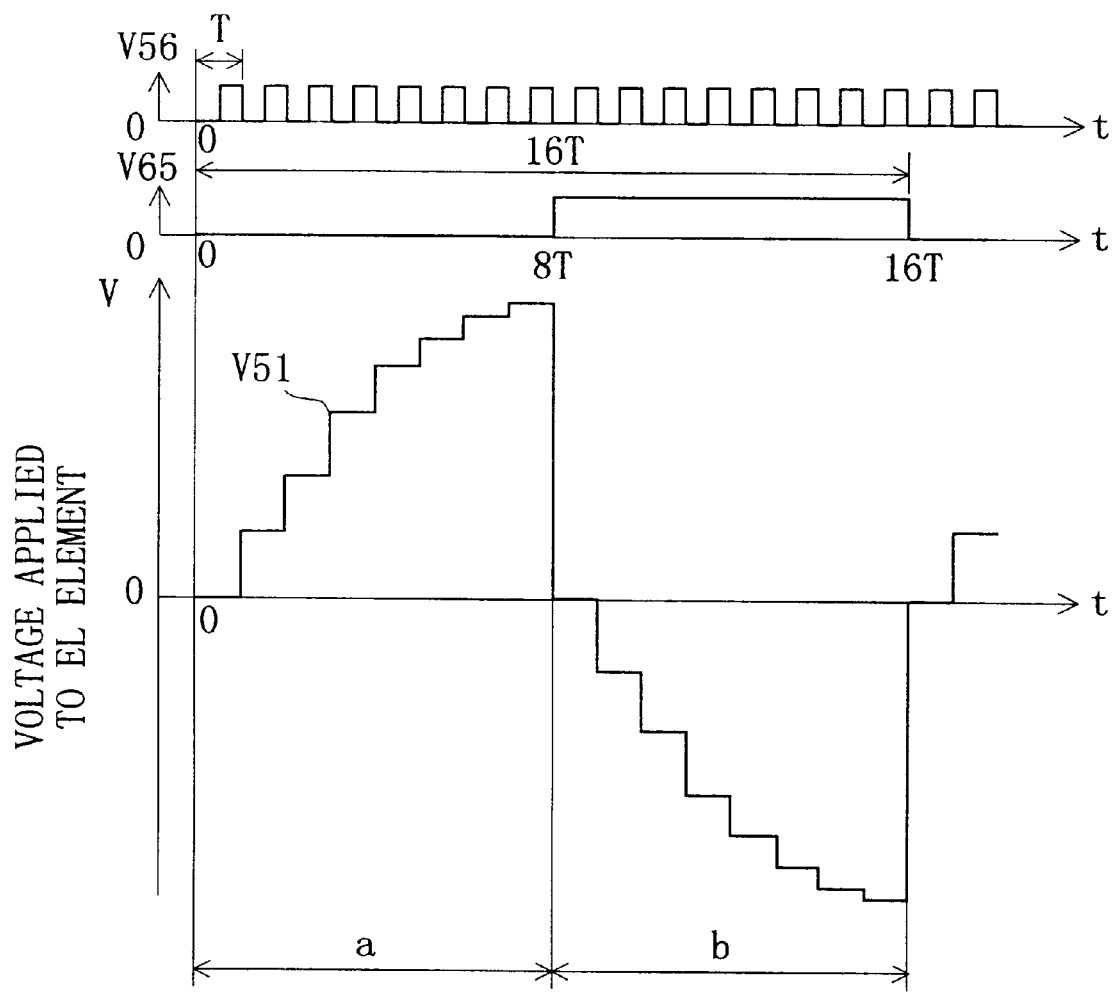
FIG. 11 is a timing chart of output signals of an oscillator, a frequency divider and an output terminal in the conventional EL display.
Figure 12:
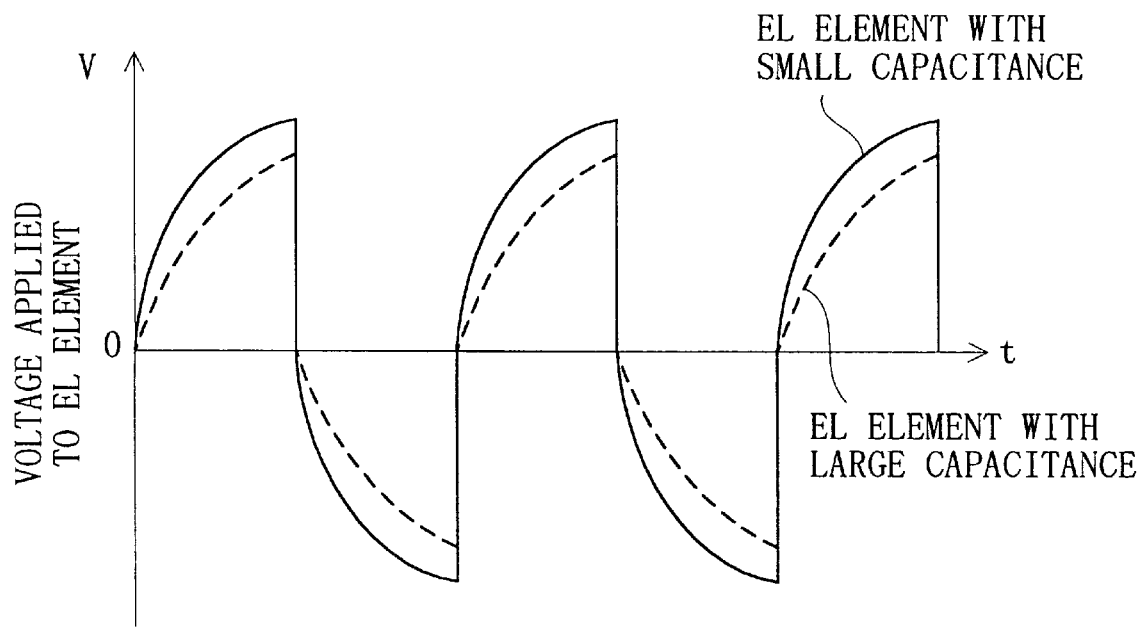
FIG. 12 is a graph of an output signal applied to an EL element in the conventional driving circuit.
Figure 13:
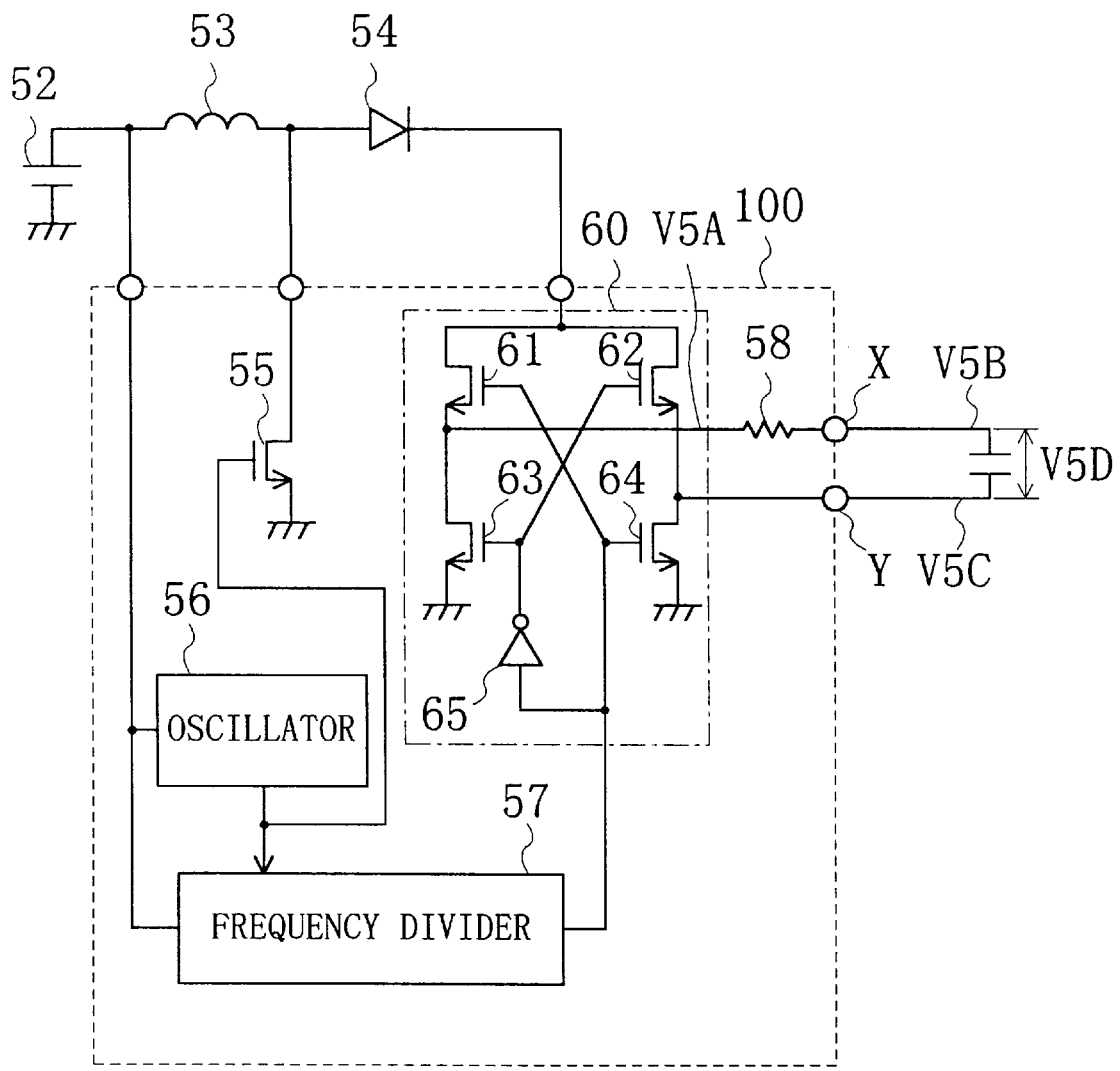
FIG. 13 is a circuit diagram of an EL display including the conventional EL driving circuit provided with a resistor.

When such a resistor is interposed between the driving circuit and the output terminal in the conventional EL display, there arises the following nonconformity:

FIG. 13 is a circuit diagram of an EL display including the conventional driving circuit provided with a resistor for suppressing a noise. In FIG. 13, like reference numerals are used to refer to like elements used in FIG. 10, and the description is omitted. As an additional composing element, as is shown in FIG. 13, a resistor 58 is serially connected between the first output terminal X and a node between the source electrode of the first N-channel MOS transistor 61 and the drain electrode of the third N-channel MOS transistor 63. In FIG. 13, V5A indicates a voltage at the node between the source electrode of the first N-channel MOS transistor 61 and the drain electrode of the third N-channel MOS transistor 63, V5B indicates a voltage at the first output terminal X, V5C indicates a voltage at a node between the source electrode of the second N-channel MOS transistor 62 and the drain electrode of the fourth N-channel MOS transistor 64, namely, a voltage at the second output terminal Y, and V5D indicates a potential difference between the first output terminal X and the second output terminal Y corresponding to the voltage to be applied to the EL element 1, namely, a difference between the voltages V5B and V5C.

The operation of the conventional EL display having the aforementioned configuration will now be described. First, in the circuit of FIG. 13, when the first and fourth N-channel MOS transistors 61 and 64 are in an on-state and the second and third N-channel MOS transistors 62 and 63 are in an off-state, the voltage V5A at the source electrode of the first N-channel MOS transistor 61 is increased by the coil 53 and the step-up transistor 55 of the step-up circuit 10, and the voltage V5C at the second output terminal Y is 0 V.

Figure 14A:
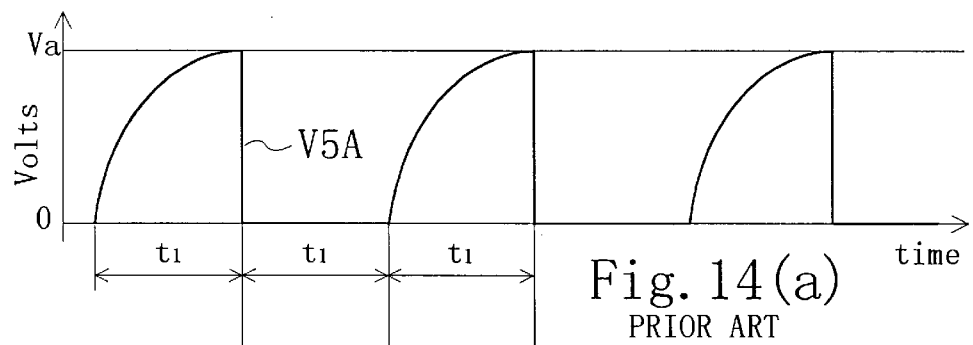
Figure 14B:
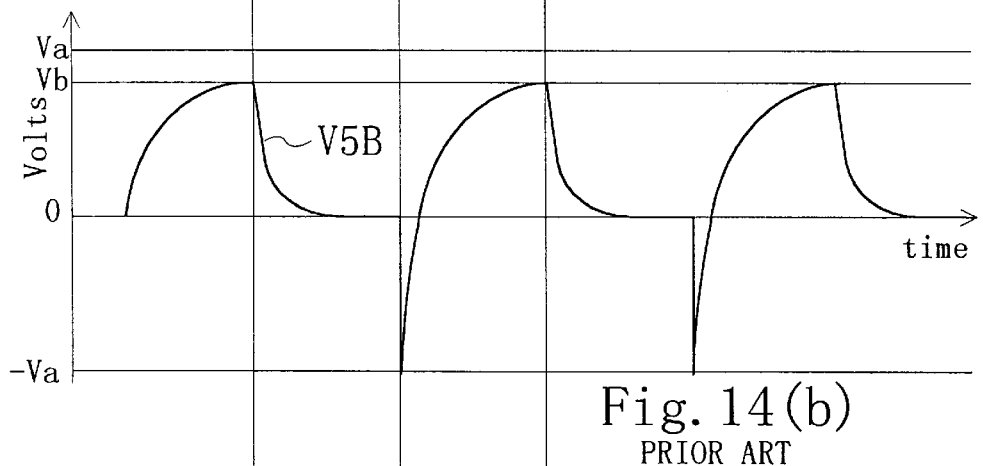

This voltage variation will be described with reference to FIGS. 14(a) through 14(d). While the voltage V5A shown in FIG. 14(a) is being increased, the voltage V5C shown in FIG. 14(c) remains to be 0 V. Also, as is shown in FIG. 14(b), the voltage V5B having passed through the resistor 58 is decreased by the resistor 58, and therefore, the voltage V5B is decreased by a voltage (Va–Vb) as compared with the voltage V5A.

Figure 14C:
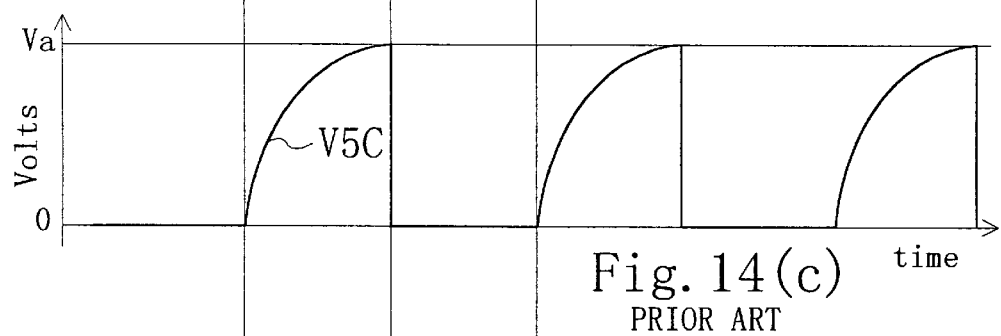

Next, after predetermined time t1 determined by the frequency divider 57, the first and fourth N-channel MOS transistors 61 and 64 are turned off and the second and third N-channel MOS transistors 62 and 63 are turned on. As a result, the voltage V5C shown in FIG. 14(c) is increased and the voltage V5A shown in FIG. 14(a) is decreased to 0 V. At this point, since the voltage V5B is discharged through the resistor 58 as is shown in FIG. 14(b), it is integrated with regard to the product of a capacitance component of the EL element 51 and a resistance component of the resistor 58, and hence the waveform at the fall is made gentle.

Next, as is shown in FIGS. 14(a) and 14(c), after subsequent predetermined time t1 elapses, the on- and off-states of the respective transistors are inverted. Therefore, the voltage V5A is increased, the voltage V5C is decreased to 0 V, and the voltage V5B shown in FIG. 14(b) is instantaneously decreased to a minus potential by the decreased amount of the voltage V5C and starts to increase.

Figure 14D:
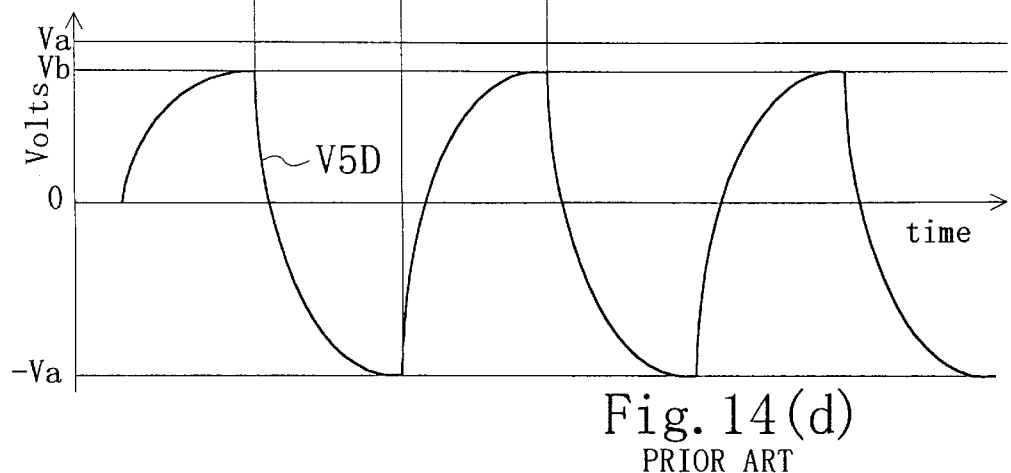

As is shown in FIG. 14(d), the voltage V5D to be applied to the EL element 51 corresponds to a difference between the voltages V5B and V5C, and the waveform of the voltage V5D is made blunt at the fall from the increased voltage to 0 V.

In this manner, the steep voltage waveform at the fall, which conventionally causes a drive noise of the EL element 51, can be delayed so as to decrease the noise.

However, as is shown in FIG. 14(d), the voltage V5D to be applied to the EL element 51 is decreased by the decreased voltage (Va–Vb) owing to the resistor 58 as compared with the conventional EL display not including the resistor 58. As a result, the brightness of the display is disadvantageously degraded.

Figure 15:
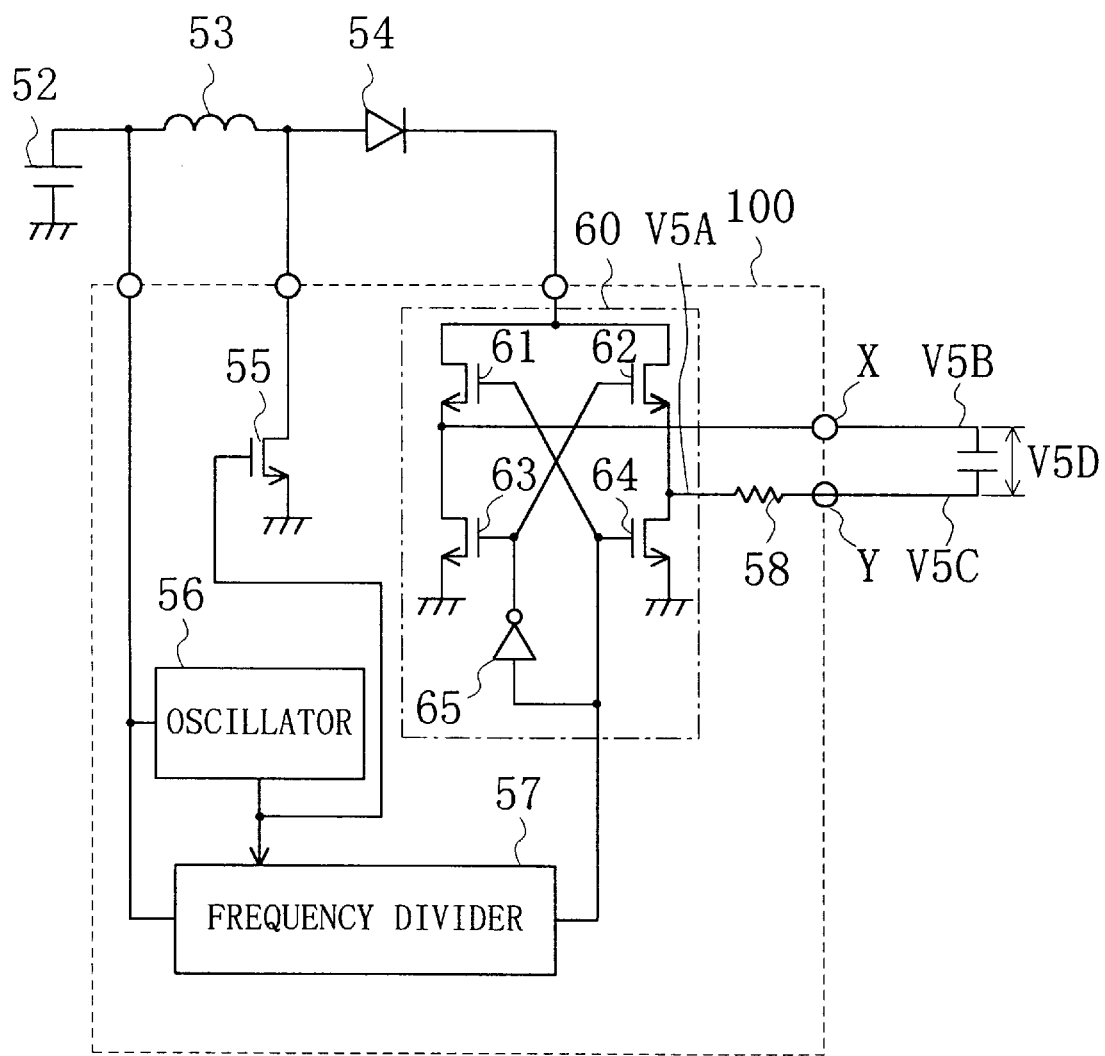
FIG. 15 is a circuit diagram of another EL display including the conventional EL driving circuit provided with a resistor.
Figure 16A:
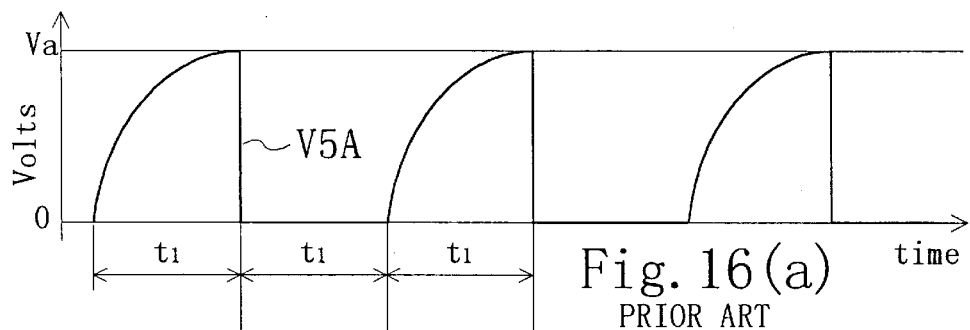
Figure 16B:
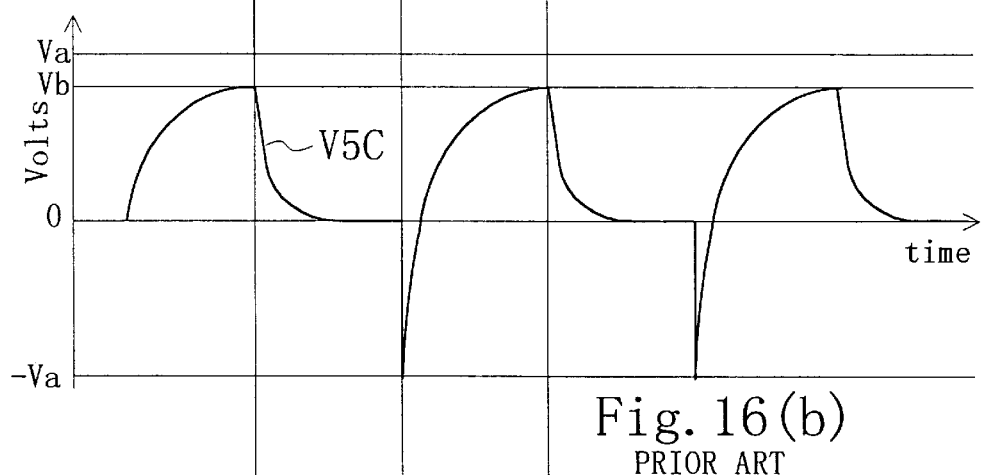
Figure 16C:
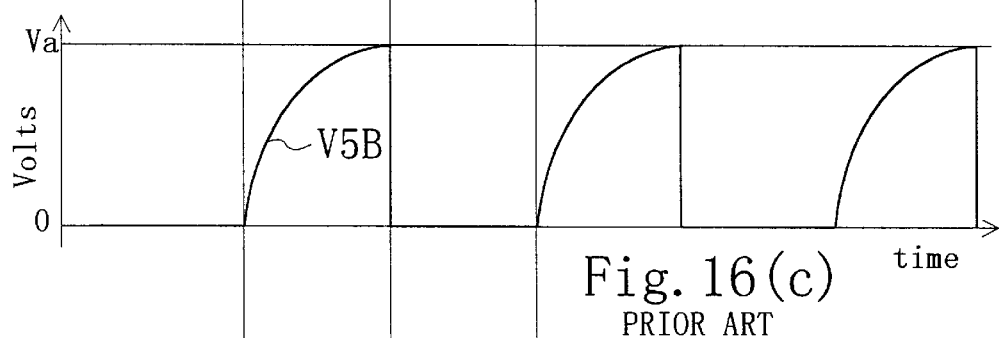
Figure 16D:
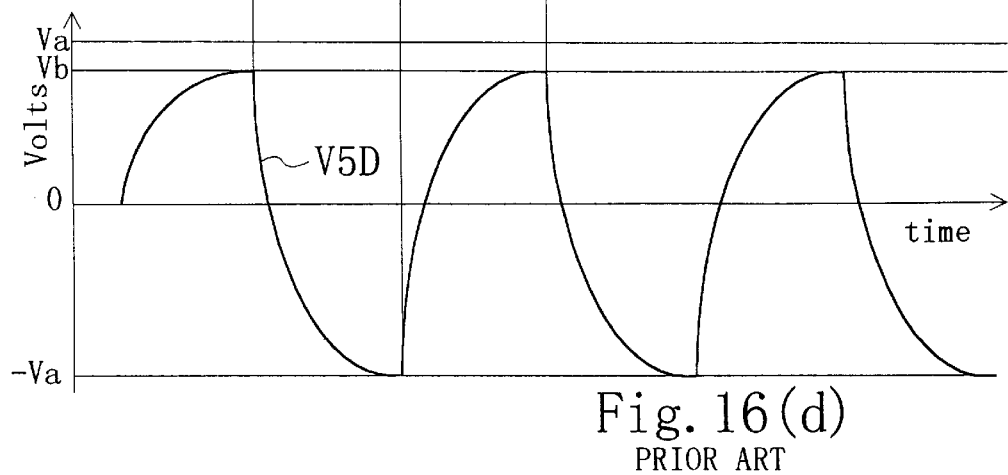

Even when the resistor 58 is serially connected not with the first output terminal X but with the second output terminal Y as is shown in a circuit diagram of an EL display of FIG. 15, the voltage V5D to be applied to the EL element 51 is decreased by the decreased voltage (Va–Vb) as compared with the conventional EL display not provided with the resistor 58 as is shown in FIG. 16(d).

Figure 17:
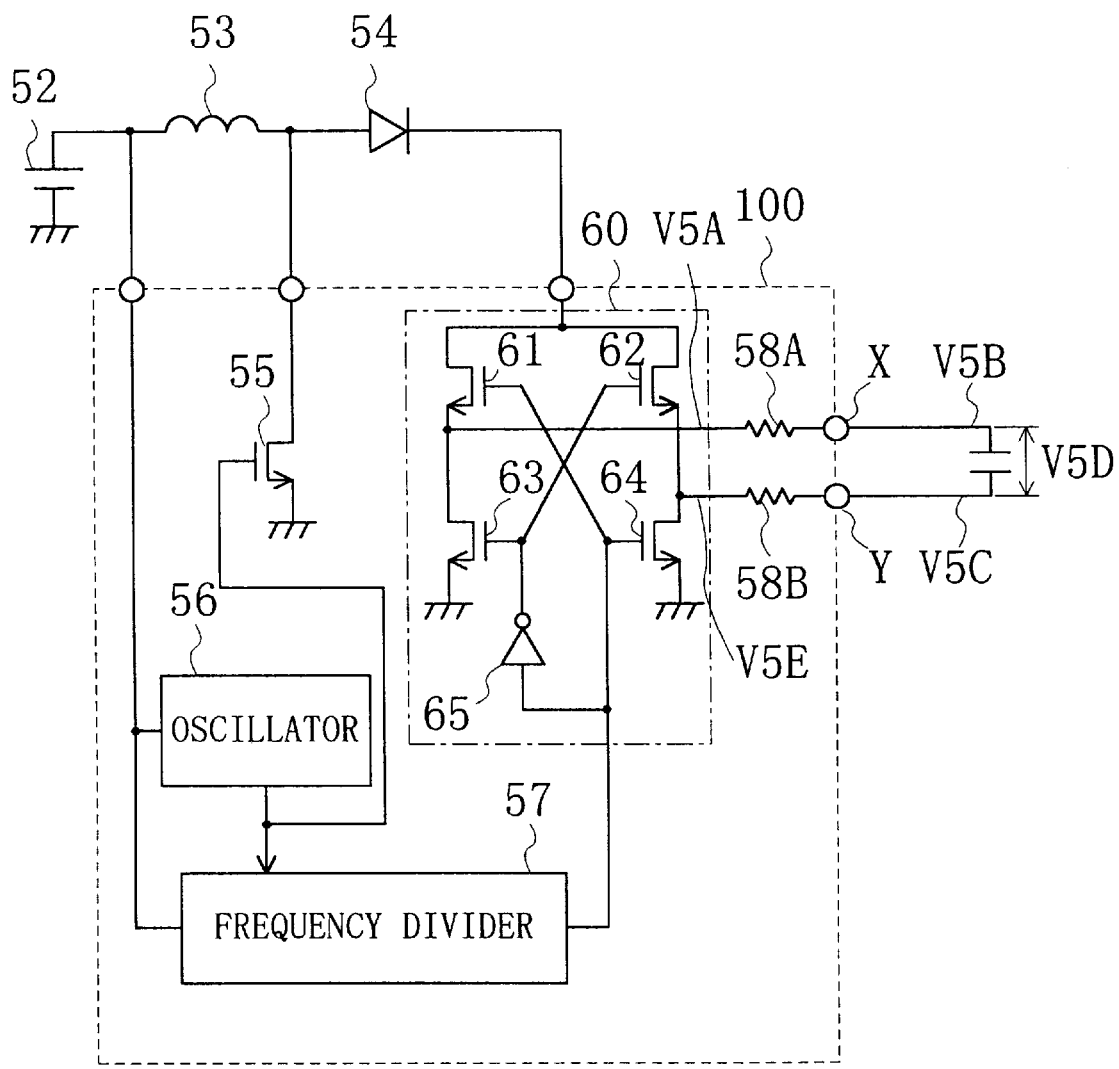
FIG. 17 is a circuit diagram of an EL display including the conventional EL driving circuit provided with first and second resistors.
Figure 18A:
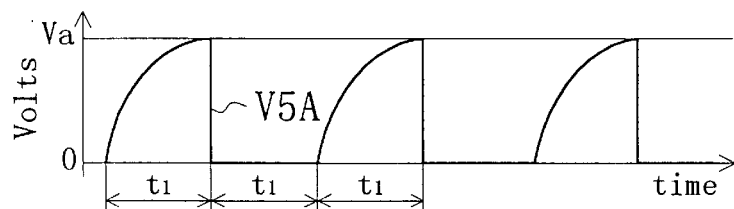
Figure 18B:
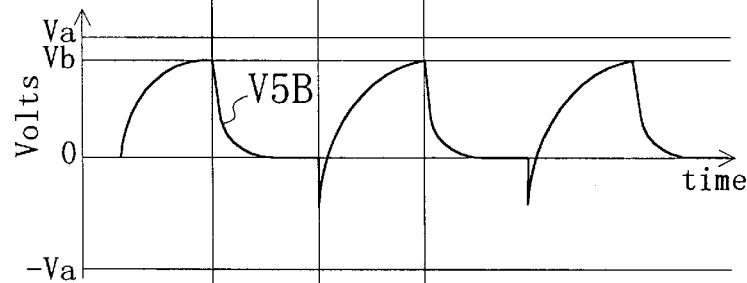
Figure 18C:
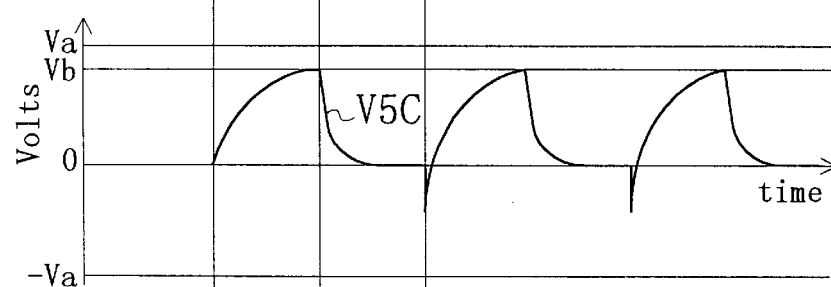
Figure 18D:
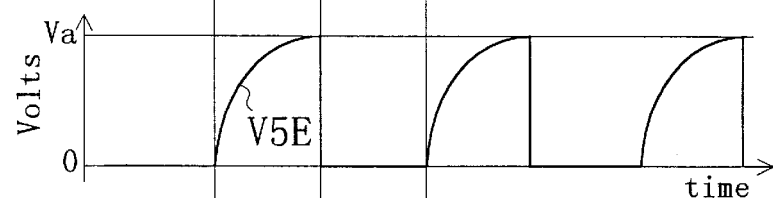
Figure 18E:
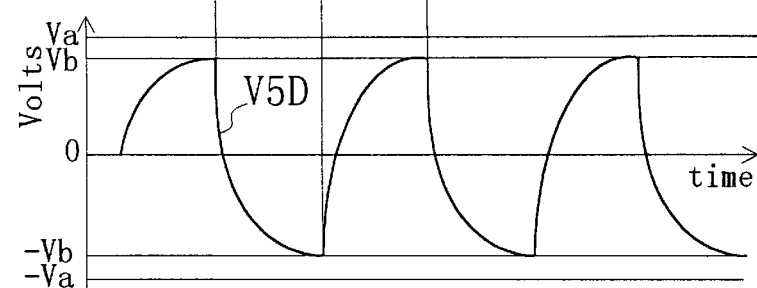

Also, in the case where a first resistor 58 is serially connected with the first output terminal X and a second resistor 58B is serially connected with the second output terminal Y as is shown in a circuit diagram of an EL display of FIG. 17, the voltage V5D to be applied to the EL element 51 is decreased by twice of the decreased voltage, i.e., 2×(Va−Vb), as compared with the conventional EL display provided with neither the first resistor 58A nor the second resistor 58B as is shown in FIG. 18(e).

In contrast, in the EL display of the second embodiment attained by additionally providing the resistor to the EL display of the first embodiment, the noise can be decreased without degrading the brightness of the EL element.

What is claimed is:

1. An EL display comprising:

step-up signal generating means for generating a step-up signal by increasing a supply voltage in accordance with a pulse signal;

switching circuit for outputting a first output signal in response to said step-up signal and for outputting a second output signal by inverting a polarity of said step-up signal;

an EL element including electrodes connected with a first output terminal and a second output terminal of said switching circuit, respectively; and a voltage detector for inverting a polarity of said second output signal of said switching circuit by receiving said first output signal from said switching circuit and outputting a control signal to said switching circuit on the basis of a predetermined voltage of said received first output signal, wherein a voltage applied across said EL element is formed by a potential difference between output signals outputted from said first output terminal and said second output terminal, respectively.

2. The EL display of claim 1, wherein said step-up signal generating means includes:

a series circuit of a coil and a diode serially connected with each other at a node; and a step-up transistor connected with said node in said series circuit at a main electrode thereof for receiving said pulse signal at a control electrode thereof.

3. An EL display comprising:

step-up signal generating means for generating a step-up signal by increasing a supply voltage in accordance with a pulse signal;

switching circuit for outputting a first output signal in response to said step-up signal and for outputting a second output signal by inverting a polarity of said step-up signal;

an EL element connected with an output of said switching circuit;

a voltage detector for inverting a polarity of said second output signal of said switching circuit by receiving said first output signal from said switching circuit and outputting a control signal to said switching circuit on the basis of a predetermined voltage of said received first output signal; and an oscillator for outputting said pulse signal to said step-up signal generating means, wherein said switching circuit includes a transistor, said step-up signal generating means includes:

a series circuit including a diode and a coil, said diode being connected with a main electrode of said transistor of said switching circuit at a cathode, and one end of said coil being connected with a power supply and the other end of said coil being connected with an anode of said diode through a node; and a step-up transistor connected with said node in said series circuit at a main electrode thereof for receiving said pulse signal at a control electrode thereof, and said control signal output by said voltage detector enters a control electrode of said transistor of said switching circuit.

4. The EL display of claim 1, wherein said second output signal of said switching circuit has a blunt waveform.

5. The EL display of claim 1, further comprising a resistor serially connected between said switching circuit and said EL element for delaying discharge time of a charge discharged through said switching circuit.

6. A driving circuit for a display comprising:

a switching circuit including:

a first N-channel MOS transistor and a second N-channel MOS transistor connected with each other at drain electrodes thereof;

a third N-channel MOS transistor grounded at a source electrode thereof, connected with a source electrode of said first N-channel MOS transistor at a drain electrode thereof and with a gate electrode of said second N-channel MOS transistor at a gate electrode thereof;

a fourth N-channel MOS transistor grounded at a source electrode thereof, connected with a source electrode of said second N-channel MOS transistor at a drain electrode thereof and with a gate electrode of said first N-channel MOS transistor at a gate electrode thereof;

a first output terminal connected with the drain electrode of said third N-channel MOS transistor; and a second output terminal connected with the drain electrode of said fourth N-channel MOS transistor; and a voltage detector for receiving output signals from said first and second output terminals of said switching circuit, and for outputting control signals in mutually reverse phases to the gate electrode shared by said first and fourth N-channel MOS transistors and the gate electrode shared by said second and third N-channel MOS transistors.

7. The driving circuit for a display of claim 6, wherein a voltage polarity of said control signal is inverted in said voltage detector when an output signal of said switching circuit exceeds a predetermined voltage.

8. The driving circuit for a display of claim 6, wherein an output signal of said switching circuit has a blunt waveform.

9. The driving circuit for a display of claim 6, further comprising a resistor serially connected between said switching circuit and at least one of said first and second output terminals for delaying discharge time of a charge discharged through said switching circuit.

* * * * *

UNITED STATES PATENT AND TRADEMARK OFFICE
CERTIFICATE OF CORRECTION

PATENT NO. : 6,072,477
DATED : June 6, 2000
INVENTOR(S) : Yuji Ueno

It is certified that error appears in the above-identified patent and that said Letters Patent is hereby corrected as shown below:

On the Cover Page:

In the "References Cited" section, change "Hannaoka" to --Hanoaka--.

Signed and Sealed this

Twenty-second Day of May, 2001

*Attest:*

NICHOLAS P. GODICI

*Attesting Officer*     Acting Director of the United States Patent and Trademark Office

UNITED STATES PATENT AND TRADEMARK OFFICE
CERTIFICATE OF CORRECTION

PATENT NO.   : 6,072,477
DATED        : June 6, 2000
INVENTOR(S)  : Yuji Ueno

It is certified that error appears in the above-identified patent and that said Letters Patent is hereby corrected as shown below:

Title Page:
In the "References Cited" section, change "Hannaoka" to -- Hanaoka --.

Signed and Sealed this

Twenty-fifth Day of September, 2001

Attest:

*Attesting Officer*

NICHOLAS P. GODICI
*Acting Director of the United States Patent and Trademark Office*